US012691838B2

(12) United States Patent
Miyazaki et al.

(10) Patent No.: US 12,691,838 B2
(45) Date of Patent: Jul. 28, 2026

(54) ELECTRICAL CONNECTION STRUCTURE

(71) Applicant: Yazaki Corporation, Tokyo (JP)

(72) Inventors: Yoshiya Miyazaki, Shizuoka (JP);
Nobutaka Kaneko, Shizuoka (JP);
Ginga Tanaka, Shizuoka (JP); Ryo Sato, Shizuoka (JP)

(73) Assignee: YAZAKI CORPORATION, Tokyo
(JP)

( * ) Notice: Subject to any disclaimer, the term of this
patent is extended or adjusted under 35
U.S.C. 154(b) by 198 days.

(21) Appl. No.: 18/814,860

(22) Filed: Aug. 26, 2024

(65) Prior Publication Data

US 2025/0074341 A1     Mar. 6, 2025

(30) Foreign Application Priority Data

Aug. 28, 2023     (JP) ................................. 2023-137897

(51) Int. Cl.
B60R 16/023          (2006.01)
H02G 5/02          (2006.01)

(52) U.S. Cl.
CPC ......... B60R 16/0238 (2013.01); H02G 5/025
(2013.01)

(58) Field of Classification Search
None
See application file for complete search history.

(56) References Cited

U.S. PATENT DOCUMENTS

| | | | | |
|---|---|---|---|---|
| 6,566,599 | B2 * | 5/2003 | Sumida | H01H 85/044 |
| | | | | 174/59 |
| 7,699,623 | B2 * | 4/2010 | Yoshida | H02G 3/081 |
| | | | | 439/949 |
| 8,723,033 | B2 * | 5/2014 | Hara | H01R 9/2466 |
| | | | | 439/76.1 |
| 8,835,760 | B2 * | 9/2014 | Saimoto | H01R 13/514 |
| | | | | 174/559 |
| 8,884,160 | B2 * | 11/2014 | Hara | B60R 16/0238 |
| | | | | 361/752 |
| 8,927,860 | B2 * | 1/2015 | Yamamoto | H02G 3/22 |
| | | | | 439/535 |
| 8,941,009 | B2 * | 1/2015 | Makino | B60R 16/0238 |
| | | | | 174/59 |

(Continued)

FOREIGN PATENT DOCUMENTS

| | | | | |
|---|---|---|---|---|
| JP | 4278829 | B2 * | 6/2009 | |
| JP | 2013013290 | A * | 1/2013 | ......... B60R 16/0238 |

*Primary Examiner* — Krystal Robinson
(74) *Attorney, Agent, or Firm* — Sughrue Mion, PLLC

(57) ABSTRACT

A holding portion in which a power supply distribution unit
is inserted and held is formed in a case of an electrical
connection structure. Here, the power supply distribution
unit includes a main body formed so as to have an approxi-
mately twice-rotation symmetrical shape with respect to an
imaginary line extending in a first direction. A projection is
formed on the main body and/or the holding portion, and a
groove into which the projection is inserted, and a restriction
wall which interferes with the projection when the power
source distribution unit is inversely inserted are formed on
the holding portion and/or the main body. Further, a projec-
tion side inclined surface capable of guiding the projection
into the groove by coming into contact with the restriction
wall when the power source distribution unit is inserted in a
state of a normal position is formed in the projection.

5 Claims, 19 Drawing Sheets

(56) References Cited

U.S. PATENT DOCUMENTS

| | | | | |
|---|---|---|---|---|
| 8,981,219 | B2 * | 3/2015 | Makino | H02G 3/088 |
| | | | | 439/535 |
| 9,000,297 | B2 * | 4/2015 | Makino | H05K 5/0208 |
| | | | | 174/50 |
| 9,038,839 | B2 * | 5/2015 | Nakayama | H02G 3/081 |
| | | | | 174/67 |
| 2004/0242050 | A1 * | 12/2004 | Ke | H01R 9/03 |
| | | | | 439/483 |
| 2005/0257950 | A1 * | 11/2005 | Yamashita | H05K 3/284 |
| | | | | 174/50 |
| 2010/0060407 | A1 * | 3/2010 | Iwata | H01H 85/143 |
| | | | | 29/623 |
| 2011/0100705 | A1 * | 5/2011 | Matsui | B60R 16/0238 |
| | | | | 174/535 |
| 2012/0295485 | A1 * | 11/2012 | Ikeda | H01M 50/204 |
| | | | | 439/626 |
| 2013/0003264 | A1 | 1/2013 | Kamo | |
| 2013/0032371 | A1 * | 2/2013 | Makino | H05K 7/026 |
| | | | | 174/50 |
| 2013/0130557 | A1 * | 5/2013 | Adachi | H01R 13/46 |
| | | | | 439/626 |
| 2014/0083733 | A1 * | 3/2014 | Kamigaichi | H02G 3/086 |
| | | | | 174/50 |
| 2015/0171608 | A1 * | 6/2015 | Ueyama | H05K 5/06 |
| | | | | 174/50 |
| 2021/0101545 | A1 * | 4/2021 | Kurata | B60R 16/0239 |
| 2021/0136940 | A1 * | 5/2021 | Hicks | H05K 5/0247 |
| 2023/0102856 | A1 * | 3/2023 | Nakashima | H02G 3/083 |
| | | | | 174/50 |
| 2023/0170679 | A1 * | 6/2023 | Kobayashi | H02G 3/081 |
| | | | | 174/50 |
| 2024/0097411 | A1 * | 3/2024 | Miyazaki | H01R 9/2475 |
| 2024/0097412 | A1 * | 3/2024 | Miyazaki | B60R 16/0239 |
| 2026/0008211 | A1 * | 1/2026 | Yamamoto | B29C 45/0025 |
| 2026/0116068 | A1 * | 4/2026 | Yoshikawa | B41J 2/14 |

* cited by examiner

341

3412

L1,P1    3412

3413

34131

3414
(341)

3413

34131

3414(341)

34141    3414(341)    34111    34111    3411(341)    34141

3411(341)

341

3412

L1,P1    3412

3413

34131

3414
(341)

3413

34131

3414(341)

34141    3414(341)    34111    34111    3411(341)    34141

3411(341)

ELECTRICAL CONNECTION STRUCTURE

CROSS-REFERENCE TO RELATED APPLICATIONS

The present application is based on, and claims priority from the prior Japanese Patent Application No. 2023-137897, filed on Aug. 28, 2023, the entire contents of which are incorporated herein by reference.

TECHNICAL FIELD

The present disclosure relates to an electrical connection structure.

BACKGROUND

An electrical connection structure disclosed in JP2013-013290A has been proposed as a conventional electrical connection structure. JP2013-013290A discloses an electrical connection box (electrical connection structure) including: a box body (case) having a holding portion; and a power source distribution unit which is inserted into and held in the box body (case).

SUMMARY OF THE INVENTION

When such a power source distribution unit is inserted and held in a case, it is preferable to suppress the power source distribution unit to be erroneously inserted into the case, and also to further improve the insertion work of the power source distribution unit.

An object of the disclosure is to provide an electrical connection structure capable of suppressing a power source distribution unit to be erroneously inserted into a case, and further improving the insertion work of the power source distribution unit.

An electrical connection structure according to an aspect of the present disclosure includes: a case having a holding portion; and a power source distribution unit which is inserted into and held in the holding portion, in which the holding portion includes: a housing space which opens in one side in a first direction and in which the power source distribution unit is housed by relatively moving the power source distribution unit to the other side in the first direction with respect to the case; and a wall defining the housing space, and the power source distribution unit is provided with a main body including: a bus bar having a power source connection portion and a plurality of load connection portions, and capable of distributing power source; a plurality of fuse portions interposed between the power source connection portion and the load connection portion; and a cover for holding the bus bar, the main body is formed so as to have an approximately twice-rotation symmetrical shape with respect to an imaginary line extending in the first direction, a projection is formed at least on one of the main body and the holding portion, a groove into which the projection is inserted when the power source distribution unit is inserted into the housing space in a state of a normal position, and a restriction wall which interferes with the projection when the power source distribution unit is inserted into the housing space in a state of an inverse position are formed at least on the other of the main body and the holding portion, and a projection side inclined surface capable of guiding the projection into the groove by coming into contact with the restriction wall when the power source distribution unit is inserted into the housing space in a state of the normal position is formed in the projection.

According to the present disclosure, it makes possible to provide an electrical connection structure capable of suppressing a power source distribution unit to be erroneously inserted into a case, and further improving the insertion work of the power source distribution unit.

DETAILED DESCRIPTION OF THE INVENTION

Various embodiments will be described hereinafter with reference to the accompanying drawings.

Hereinafter, an electrical connection structure according to a present embodiment will be described in detail with reference to the drawings. Note that the dimensional ratio of the drawings is exaggerated for the sake of explanation, and may differ from the actual ratio. In the following embodiment, a multi-fusible link unit having a plurality of fusible link portions is exemplified as a power source distribution unit.

The direction in which the multi-fusible link unit is inserted is defined as the Z direction (up-down direction: first direction), and the longitudinal direction of the case is defined as the Y direction (width direction: second direction). The shorter-side direction of the case is defined as the X direction (front-rear direction: third direction).

In addition, a description will be given regarding the electrical connection structure by defining the up-down direction of each member in a state where the electrical connection structure is arranged in such a way as to be held in the case by moving the multi-fusible link from the upper side to the lower side. In addition, the side where the multi-fusible link unit is positioned is defined as the front side in the X direction (front-rear direction: third direction), and the side where the electronic components other than the multi-fusible link unit are positioned is defined as the rear side in the X direction (front-rear direction: third direction).

As illustrated in FIGS. 1 to 4, an electrical connection structure 1 according to the present embodiment includes a case 2, a power source distribution circuit component 30 held in the case 2, and a battery circuit component 40 held at the position different from that where the power source distribution circuit component 30 is held in the case 2.

Figure 11:
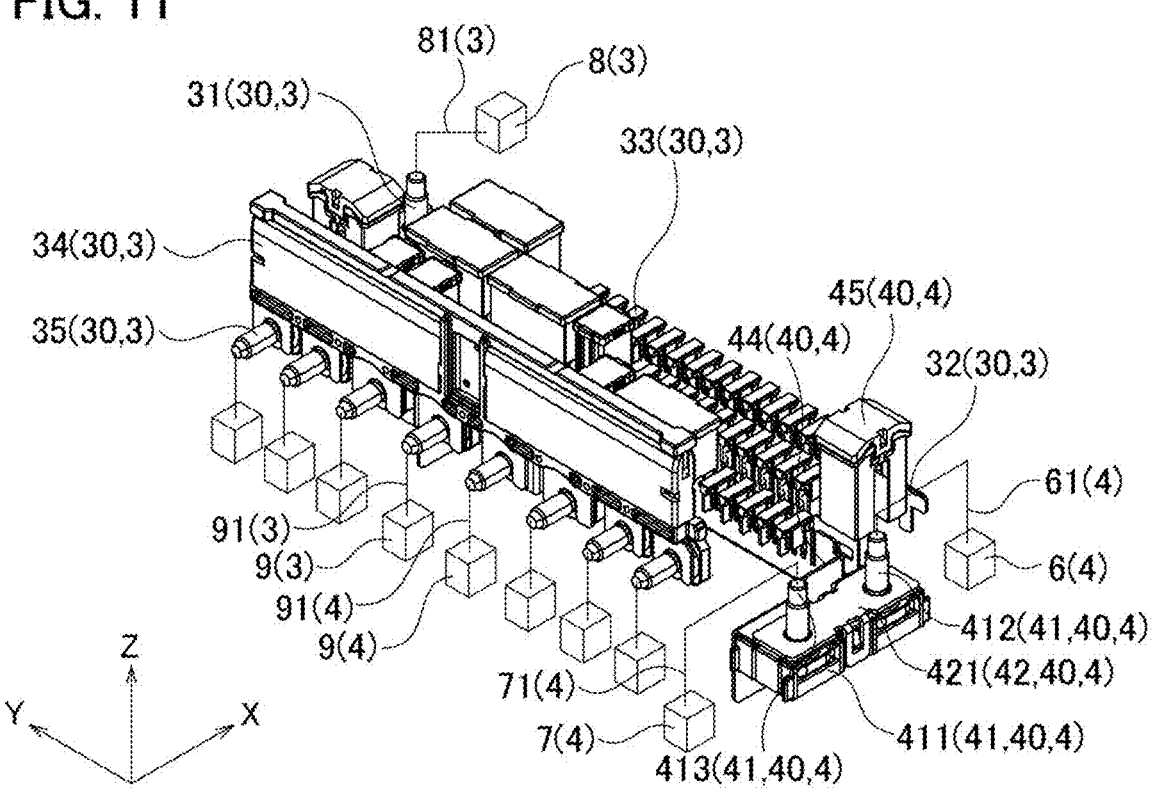
FIG. 11 is a perspective view schematically illustrating an example of a power source distribution circuit and an example of a battery circuit without the relief terminal according to the embodiment.
Figure 12:
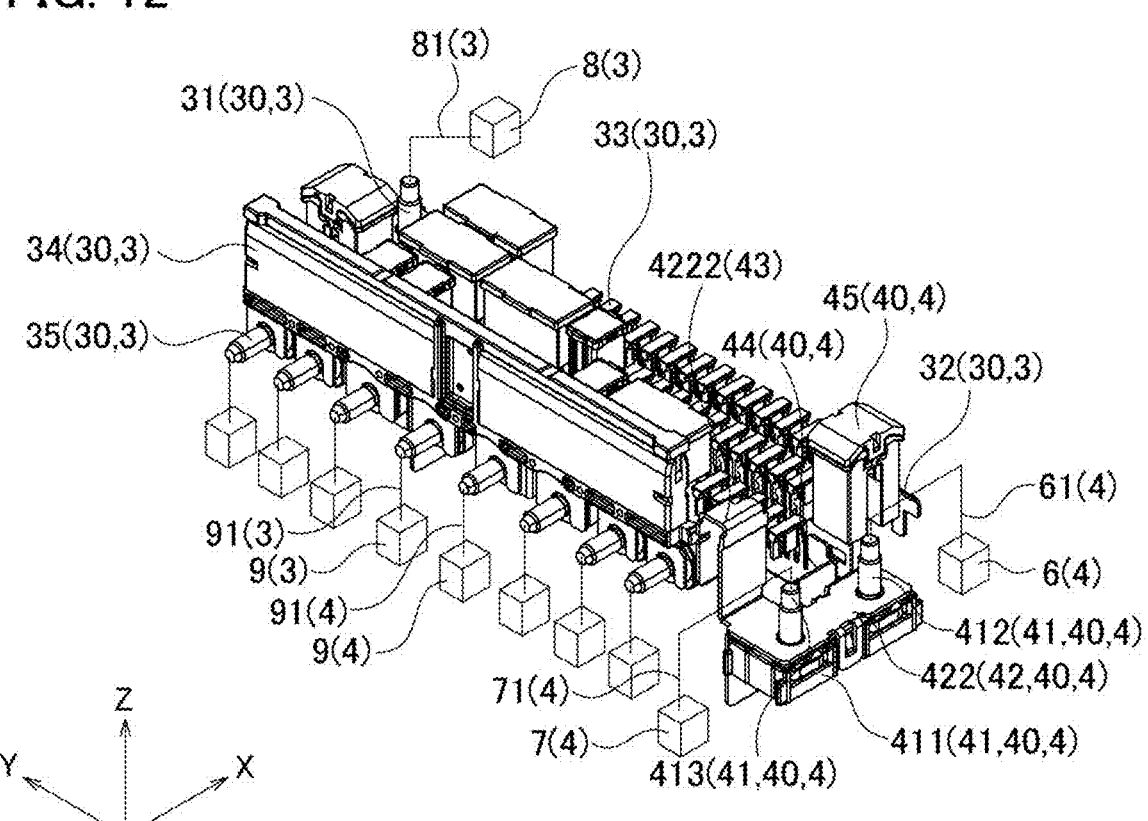
FIG. 12 is a perspective view schematically illustrating an example of the power source distribution circuit and an example of the battery circuit with the relief terminal according to the embodiment.

Here, the power source distribution circuit component 30 is a component constituting part of the power source distribution circuit 3 for distributing power supplied from the power source 8 to a plurality of loads 9. In the present embodiment, the power source circuit component 30 includes a power source terminal block 31 having a power source bolt (power source terminal) 312 electrically connected to the power source 8 via an electric wire 81, as illustrated in FIGS. 11 and 12. The power source circuit component 30 also includes a power source distribution bus bar 32 electrically connected to the power source bolt (power source terminal) 312, and an electronic component 33 electrically connected to the power source distribution bus bar 32. For example, an accessory (ACC) power source can be used as the power source 8. In addition, the load 9 to which the power is distributed includes, for example, an accessory machine such as an electric power steering system (EPS) or other electrical connection structures.

The battery circuit component 40 is a component that is electrically connected to a battery 6, and constitutes part of the battery circuit 4 for receiving power source supply from the battery 6 and charging the battery 6. In the present embodiment, the battery circuit component 40 includes a battery circuit terminal block 41 as illustrated in FIGS. 11 and 12. The battery circuit terminal block 41 includes a first bolt (battery connection terminal) 412 electrically connected to the battery 6 via an electric wire 61, and a second bolt (load connection terminal) 413 connected to a load 7 via an electric wire 71. Further, the battery circuit component 40 includes a battery circuit bus bar 42 for electrically connecting the first bolt (battery connection terminal) 412 and the second bolt (load connection terminal) 413.

The electrical connection structure 1 having the above configuration is a member constituting part of an electrical connection box such as a junction box, a relay box, and a fuse box mounted on a vehicle such as an automobile. For example, the electrical connection box can be formed by covering the upper and lower parts of the electrical connection structure 1 with an upper cover and a lower cover (not illustrated). Further, the electrical connection box can be formed by housing the electrical connection structure 1 together with other electric equipment in the housing (not illustrated).

Figure 1:
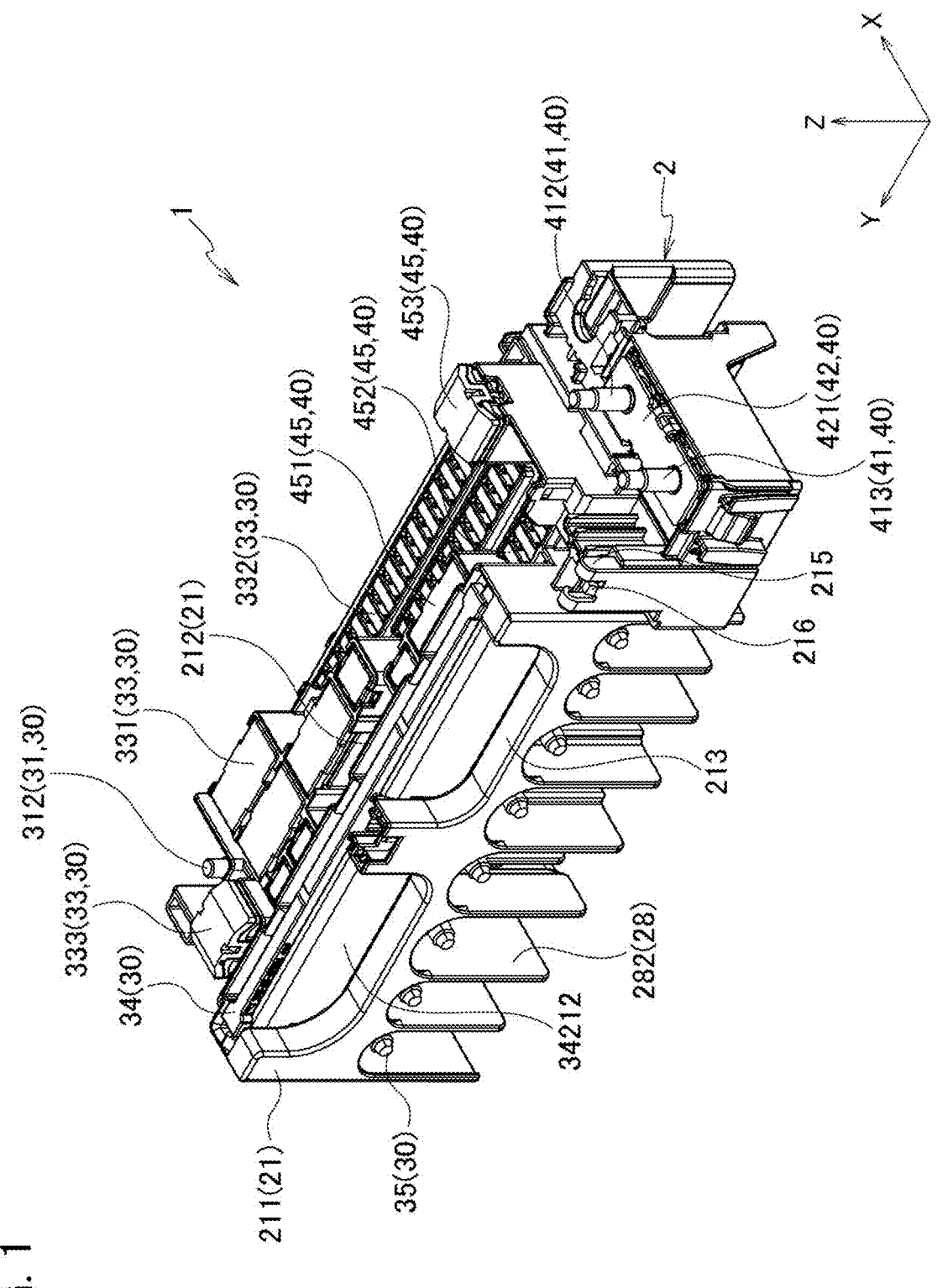
FIG. 1 is a perspective view illustrating an example of an electrical connection structure according to an embodiment, in which the electrical connection structure without a relief terminal is viewed from one direction.
Figure 2:
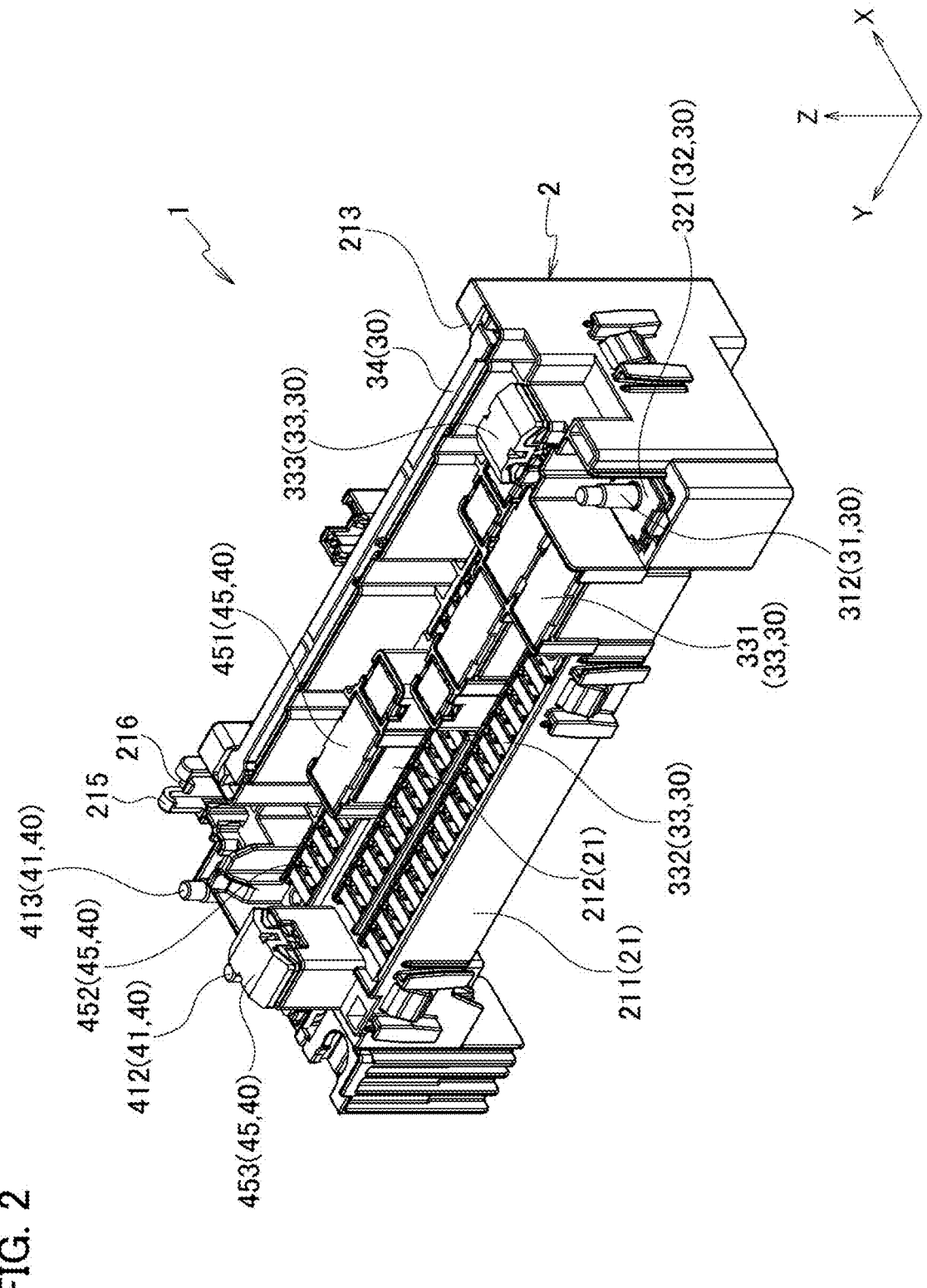
FIG. 2 is a perspective view illustrating an example of the electrical connection structure according to the embodiment, in which the electrical connection structure without the relief terminal is viewed from another direction.
Figure 3:
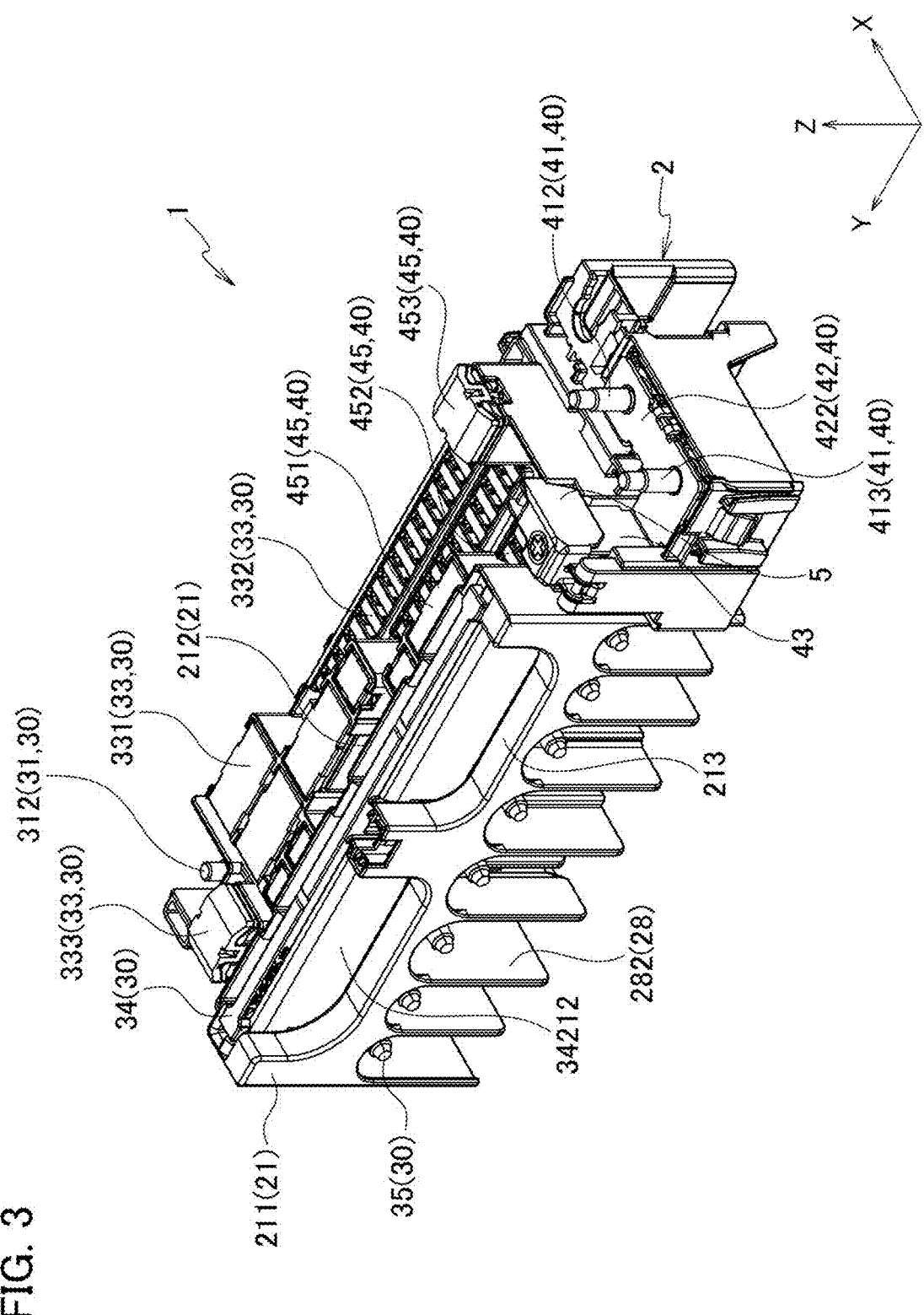
FIG. 3 is a perspective view illustrating an example of the electrical connection structure according to the embodiment, in which the electrical connection structure provided with the relief terminal is viewed from one direction.
Figure 4:
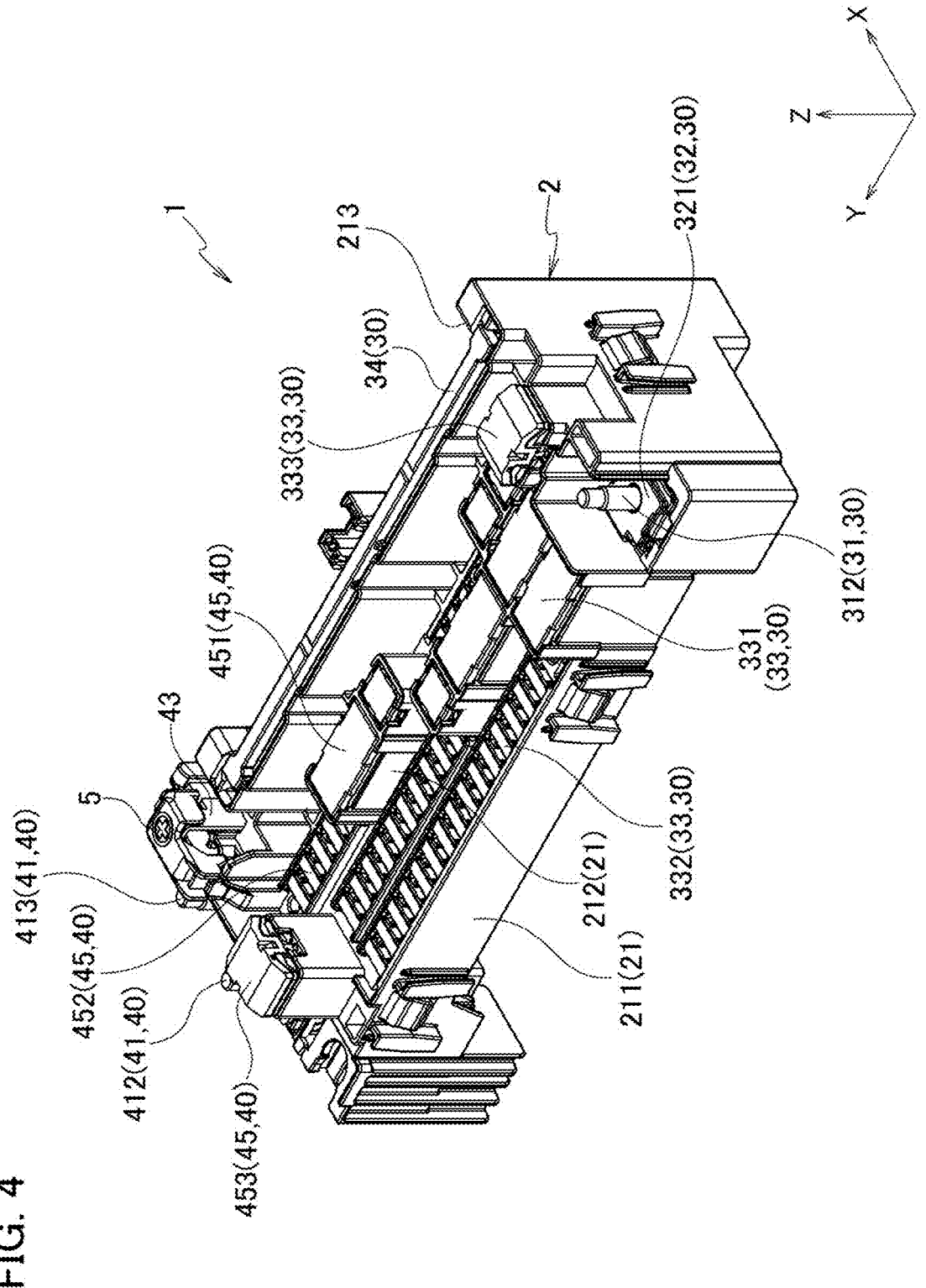
FIG. 4 is a perspective view illustrating an example of the electrical connection structure according to the embodiment, in which the electrical connection structure provided with the relief terminal is viewed from another direction.

Further, in the present embodiment, the electrical connection structure 1 is configured so as to be compatible with a variety of vehicle specifications, such as vehicle type and grade. Specifically, the electrical connection structure 1 without a relief terminal 43 is mounted on a vehicle in which the battery 6 is disposed in the engine compartment, such as a gasoline engine vehicle, as illustrated in FIGS. 1 and 2. In contrast, the electrical connection structure 1 provided with the relief terminal 43 is mounted on a vehicle in which the battery 6 is disposed in a space like a luggage space other than the engine compartment, such as an electric vehicle (for example, hybrid-engine vehicle), as illustrated in FIGS. 3 and 4. The relief terminal 43 is a component for receiving a battery charge from another vehicle.

As described above, in the present embodiment, the electrical connection structure 1 without the relief terminal 43 or the electrical connection structure 1 provided with the relief terminal 43 can be selected. By selecting any one of the electrical connection structures 1, it becomes possible to be compatible with a variety of vehicle specifications.

In the present embodiment, when the electrical connection structure 1 is not provided with the relief terminal 43, an alternator is connected to the load 7 side, and the battery 6 is charged by the alternator (load 7).

In contrast, when the electrical connection structure 1 is provided with the relief terminal 43, a starter is connected to the load 7 side, and power is supplied to the starter (load 7) from the battery 6. In addition, a clip portion of a booster cable is connected to the relief terminal 43, and thus the battery 6 can be charged from another vehicle.

Next, a specific configuration of the electrical connection structure 1 according to the present embodiment will be described.

The case 2 has an approximately rectangular parallelepiped shape, and includes a wall 21 serving as a framework of the case 2. The case 2 can be formed by using a material having electric insulating properties (resin such as polypropylene), for example.

Figure 9:
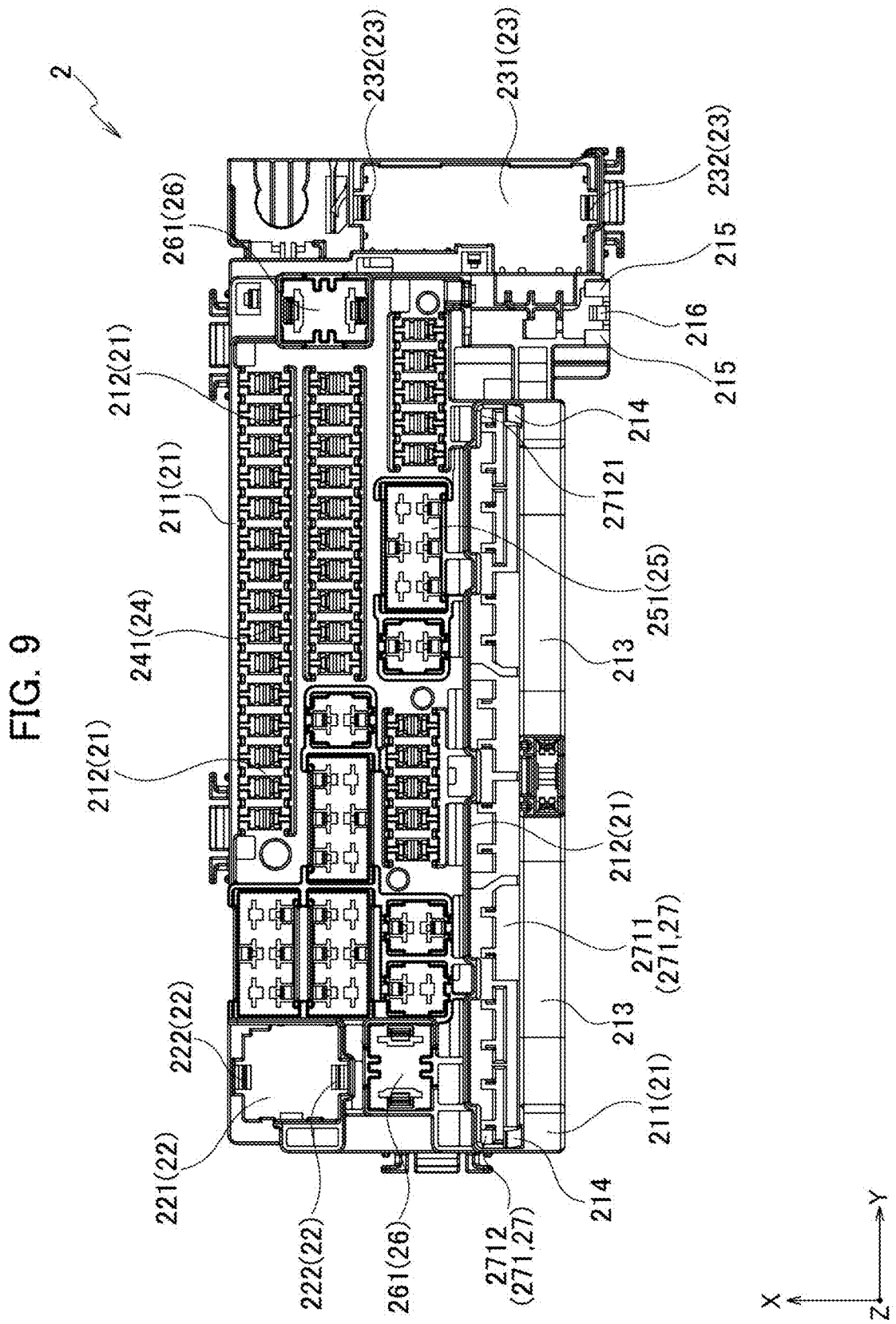
FIG. 9 is a plan view illustrating an example of a case according to the embodiment.
Figure 10:
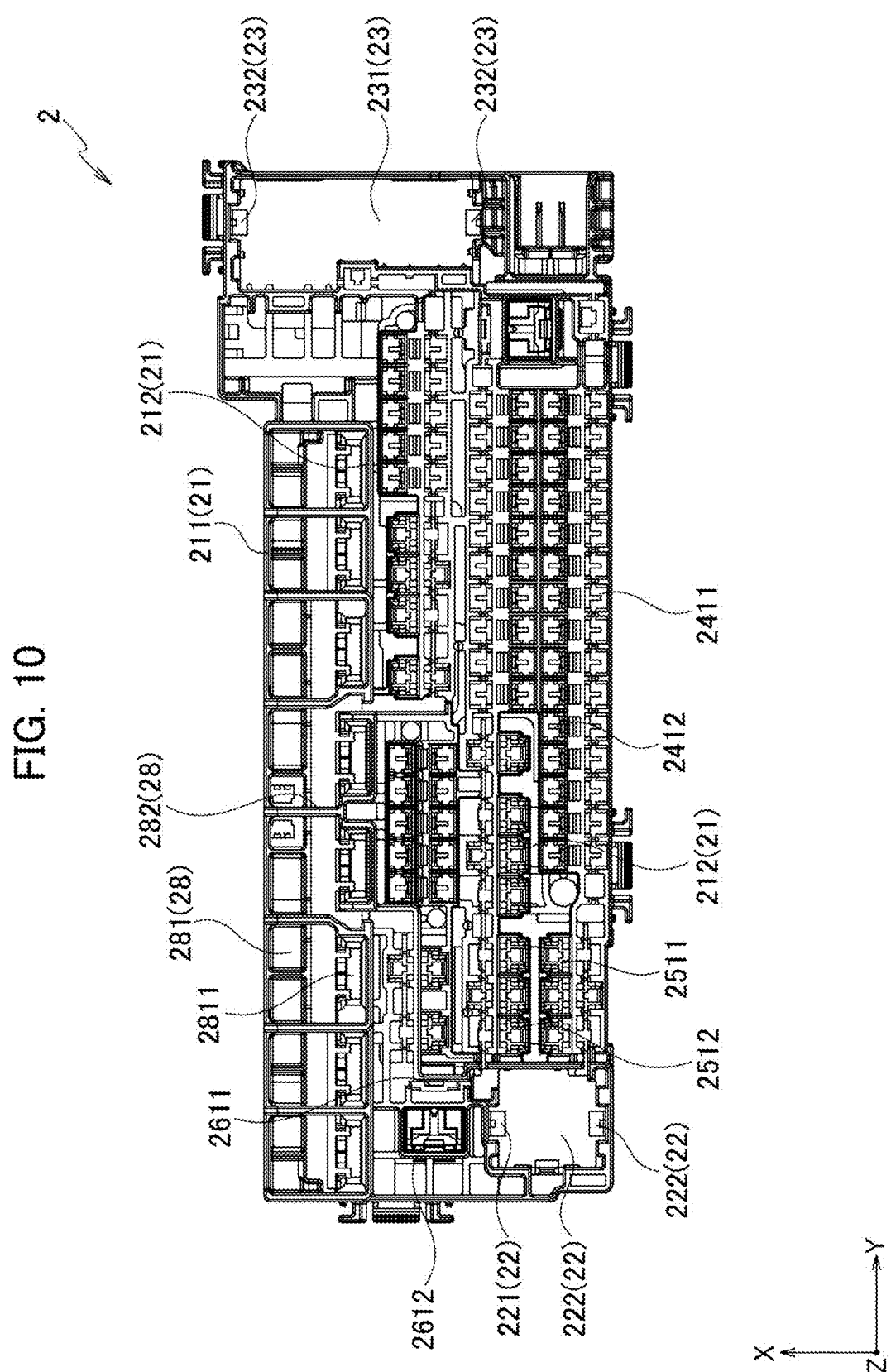
FIG. 10 is a back side view illustrating an example of the case according to the embodiment.

The wall 21 has a peripheral wall 211 and a partition wall 212, and a number of spaces penetrating in the Z direction (up-down direction: first direction) are defined by the peripheral wall 211 and the partition wall 212 (see FIGS. 9 and 10). The power source distribution circuit components 30 and the battery circuit components 40 are housed in the spaces defined by the peripheral wall 211 and the partition wall 212.

Specifically, the case 2 includes a power source terminal block holding portion 22 in which a housing space 221 for housing and holding the power source terminal block 31 is formed. In the present embodiment, a holding projection 222 is formed on the wall 21 defining the housing space 221 so as to project into the housing space 221. The power source terminal block 31 is housed in the housing space 221 of the power source terminal block holding portion 22 in a state in which it is held by the holding projection 222. In the present embodiment, the power source terminal block 31 is held in the case 2 by being inserted into the housing space 221 from the lower side (the other side) in the Z direction (up-down direction: first direction).

The case 2 also includes a battery circuit terminal block holding portion 23 in which a housing space 231 for storing and holding the battery circuit terminal block 41 is formed. In the present embodiment, a holding projection 232 is formed on the wall 21 defining the housing space 231 so as to project into the housing space 231. The battery circuit terminal block 41 is housed in the housing space 231 of the battery circuit terminal block holding portion 23 in a state in which it is held by the holding projection 232. In the present embodiment, the battery circuit terminal block 41 is also held in the case 2 by being inserted into the housing space 231 from the lower side (the other side) in the Z direction (up-down direction: first direction). In the present embodiment, the battery circuit bus bar 42 is mounted to the battery circuit terminal block 41 from the upper side (one side) in the Z direction (up-down direction: first direction).

Further, the case 2 includes a fuse holding portion 24 in which a housing space 241 for housing and holding the fuses 332 and 452 as the electronic components 33 and 45 is formed. In the present embodiment, the fuses 332 and 452 are held in the case 2 by being inserted into the housing space 241 from the upper side (one side) in the Z direction (up-down direction: first direction). Further, a tuning fork terminal insertion space 2411 into which a tuning fork terminal 3223 formed in the power source distribution bus bar 32 and a tuning fork terminal 444 formed in a battery side power source distribution bus bar 44 are inserted is formed at the lower part of the housing space 241 in the Z direction (up-down direction: first direction). In the present embodiment, the tuning fork terminals 3223 and 444 are inserted into the housing space 241 (tuning fork terminal insertion space 2411) from the lower side (the other side) in the Z direction (up-down direction: first direction). Further, an external connection terminal insertion space 2412 into which an external connection terminal (not illustrated) connected to the other end of a wire in which a load is connected to one end of the wire is inserted is formed at a position facing the tuning fork terminal insertion space 2411 in the lower part of the housing space 241 in the Z direction (up-down direction: first direction). In the present embodiment, an external connection terminal (not illustrated) is also inserted into the housing space 241 (external connection terminal insertion space 2412) from the lower side (the other side) in the Z direction (up-down direction: first direction).

When the fuses 332 and 452 are inserted into the housing space 241 from the upper side (one side) in the Z direction (up-down direction: first direction), the tuning fork terminals 3223 and 444 are configured to hold the power source side terminals 3321 and 4521 of the fuses 332 and 452. When the external connection terminal is inserted into the external connection terminal insertion space 2412 of the housing space 241 from the lower side (the other side) in the Z direction (up-down direction: first direction), the external connection terminal (not illustrated) is connected to the load side terminals 3322 and 4522 of the fuses 332 and 452. Thus, the power source 8 and the battery 6 are electrically connected to the loads (not illustrated) via the fuses 332 and 452, thereby forming a circuit (power source distribution circuit 3 or battery circuit 4) having a fuse function.

The case 2 also includes a relay holding portion 25 in which a housing space 251 for housing and holding the relays 331 and 451 as the electronic components 33 and 45 is formed. In the present embodiment, the relays 331 and 451 are held in the case 2 by being inserted into the housing space 251 from the upper side (one side) in the Z direction (up-down direction: first direction). Further, a band-plate-shaped terminal insertion space 2511 is formed at the lower part of the housing space 251 in the Z direction (up-down direction: first direction). In this band-plate-shaped terminal insertion space 2511, band-plate-shaped terminals 3212, 3222 and 3223 formed in the power source distribution bus bar 32 and a band-plate-shaped terminal 443 formed in the battery side power source distribution bus bar 44 are inserted. In the present embodiment, the band-plate-shaped terminals 3212, 3222, 3223 and 443 are inserted into the housing space 251 (band-plate-shaped terminal insertion space 2511) from the lower side (the other side) in the Z direction (up-down direction: first direction). Further, an external connection terminal insertion space 2512 into which an external connection terminal (not illustrated) connected to the other end of a wire in which a load is connected to one end of the wire is inserted is formed at a position facing the band-plate-shaped terminal insertion space 2511 in the lower part of the housing space 251 in the Z direction (up-down direction: first direction). In the present embodiment, an external connection terminal (not illustrated) is also inserted into the housing space 251 (external connection terminal insertion space 2512) from the lower side (the other side) in the Z direction (up-down direction: first direction).

When the relays 331 and 451 are inserted into the housing space 251 from the upper side in the Z direction (one side of the first direction), the band-plate-shaped terminals 3212, 3222, 3223 and 443 and the external connection terminal are electrically connected to the relays 331 and 451. Thus, the power source 8 and the battery 6 are electrically connected to the loads (not illustrated) via the relays 331 and 451, thereby forming a circuit (power source distribution circuit 3 or battery circuit 4) having a switch function.

Further, the case 2 includes another electronic component holding portion 26 in which a housing space 261 for housing and holding other electronic components 333 and 453 as the electronic components 33 and 45 is formed. In the present embodiment, the other electronic components 333 and 453 are held in the case 2 by being inserted into the housing space 261 from the upper side (one side) in the Z direction (up-down direction: first direction). Further, a band-plate-shaped terminal insertion space 2611 is formed at the lower part of the housing space 261 in the Z direction (up-down direction: first direction). A band-plate-shaped terminal 3234 formed in the power source distribution bus bar 32 and a band-plate-shaped terminal 445 formed in the battery side power source distribution bus bar 44 are inserted into the band-plate-shaped terminal insertion space 2611. In the present embodiment, the band-plate-shaped terminals 3234 and 445 are inserted into the housing space 261 (band-plate-shaped terminal insertion space 2611) from the lower side (the other side) in the Z direction (up-down direction: first direction). Further, an external connection terminal insertion space 2612 into which an external connection terminal (not illustrated) connected to the other end of a wire in which a load is connected to one end of the wire is inserted is formed at a position facing the band-plate-shaped terminal insertion space 2611 in the lower part of the housing space 261 in the Z direction (up-down direction: first direction). In the present embodiment, an external connection terminal (not illustrated) is also inserted into the housing space 261 (external connection terminal insertion space 2612) from the lower side (the other side) in the Z direction (up-down direction: first direction).

When the other electronic components 333 and 453 are inserted into the housing space 261 from the upper side in the Z direction (one side of the first direction), the band-plate-shaped terminals 3234 and 445 and the external connection terminal are electrically connected to the other electronic components 333 and 453. Thus, the power source 8 and the battery 6 are electrically connected to the loads (not illustrated) via the other electronic components 333 and 453. Accordingly, a circuit (power source distribution circuit 3 or battery circuit 4) having various functions (functions provided in the other electronic components 333 and 453) can be formed.

The case 2 also includes a power source distribution unit holding portion 27 in which a housing space 271 for housing and holding a multi-fusible link unit (power source distribution unit) 34 as the electronic components 33 and 45 is formed. In the present embodiment, the multi-fusible link unit 34 is held in the case 2 by being inserted into the housing space 271 from the upper side (one side) in the Z direction (up-down direction: first direction). The multi-fusible link unit 34 is a member formed by unitizing a plurality of fusible link portions (fuse portions) 3413. The electric wire 91 can be electrically connected via the respective fusible link portions (fuse portions) 3413 in a state in which it is inserted into the housing space 271 and held in the case 2. An allowable current value of the fusible link portions (fuse portions) 3413 is greater than that of conventional fuses (fuses 332 and 452), and thus the electric wire 91 in which a relatively large current is supplied can be connected.

In the present embodiment, the power source distribution circuit component 30 includes a plurality of electric wire connection bolts 35 to which the electric wires 91 can be connected, and the case 2 includes a power source connection bolt holding portion 28 in which a housing space 281 for housing and holding the electric wire connection bolts 35 is formed. In the present embodiment, eight power source connection bolt holding portions 28 are formed so as to be arranged in the Y direction (width direction: second direction), and one electric wire connection bolt 35 is housed and held in each power source connection bolt holding portion 28. Each power source connection bolt holding portion 28 is provided with a partition wall 282, and the partition wall 282 secures the insulation distance of the electric wires 91 connected to the electric wire connection bolts 35.

The electric wire connection bolt 35 is held in the case 2 by being inserted into the housing space 281 from the lower side (the other side) in the Z direction (up-down direction: first direction). Specifically, in the housing space 281, a head housing space 2811 in which the head 351 of the electric wire connection bolt 35 is housed and held is formed to open downward. When the head 351 of the electric wire connection bolt 35 is housed and held in the head housing space 2811 from below, a shaft 352 of the electric wire connection bolt 35 projects forward in the X direction (front-rear direction: third direction).

Further, in the present embodiment, the housing space 281 is formed below the housing space 271 in the Z direction (up-down direction: first direction). When the multi-fusible link unit 34 is held in the case 2, the load connection portion 3414 of the multi-fusible link unit 34 is inserted into the housing space 281. Thus, the load connection portion 3414 is electrically connected to the shaft 352 of the electric wire connection bolt 35.

As described above, the power source circuit component 30 includes the power source terminal block 31 having the power source bolt (power source terminal) 312, and the power source terminal block 31 includes a base 311 for holding the power source bolt (power source terminal) 312.

Figure 14:
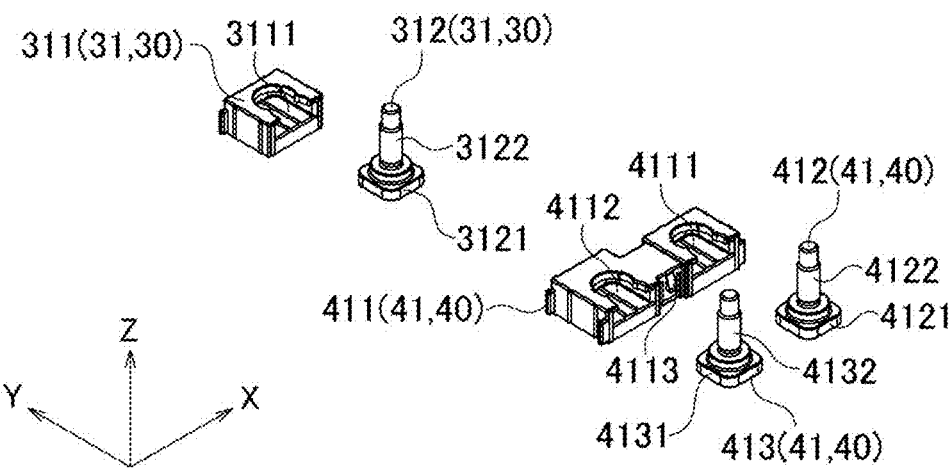
FIG. 14 is an exploded perspective view illustrating an example of a terminal block according to the embodiment.
Figures 15, 16, 17, 18:
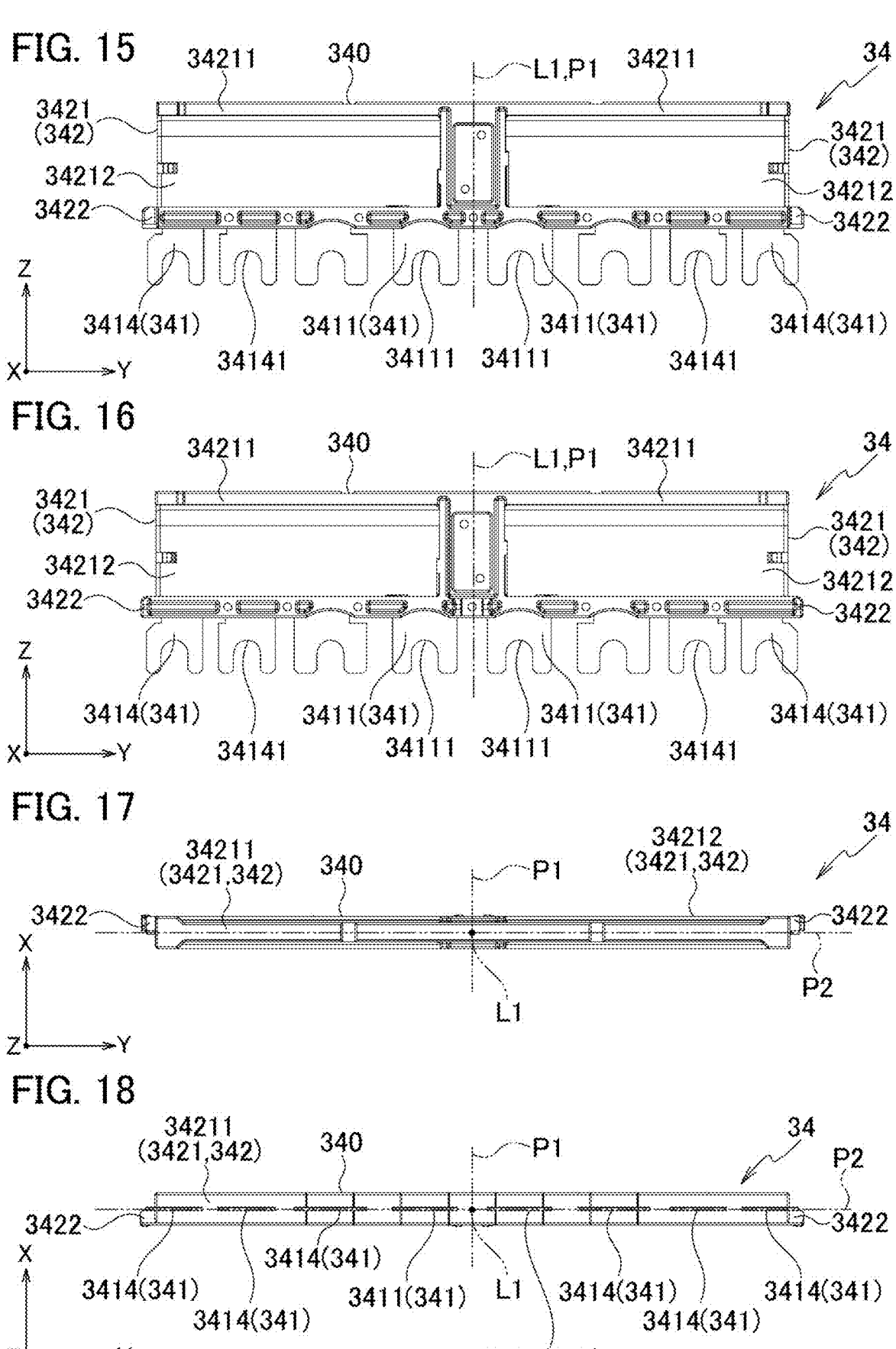
FIG. 15 is a front view illustrating an example of a multi-fusible link unit according to the embodiment.
FIG. 16 is a back view illustrating an example of the multi-fusible link unit according to the embodiment.
FIG. 17 is a plan view illustrating an example of the multi-fusible link unit according to the embodiment.
FIG. 18 is a back side view illustrating an example of the multi-fusible link unit according to the embodiment.
Figure 19:
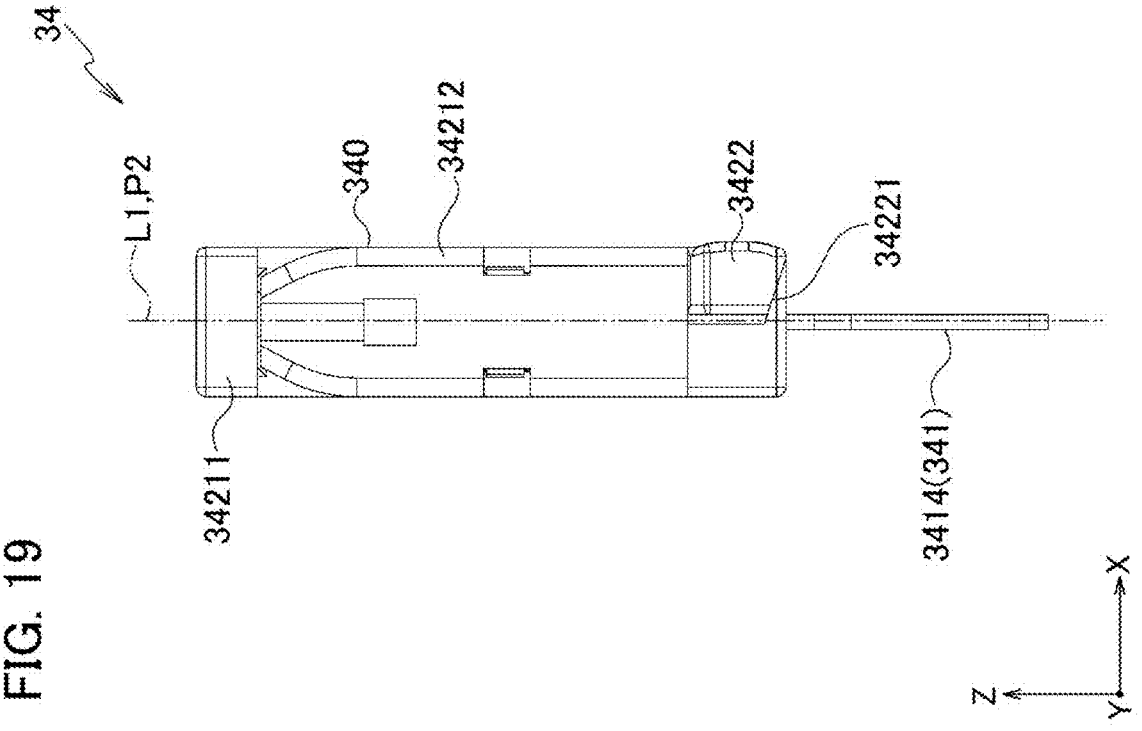
FIG. 19 is a side view on one side illustrating an example of the multi-fusible link unit according to the embodiment.
Figure 20:
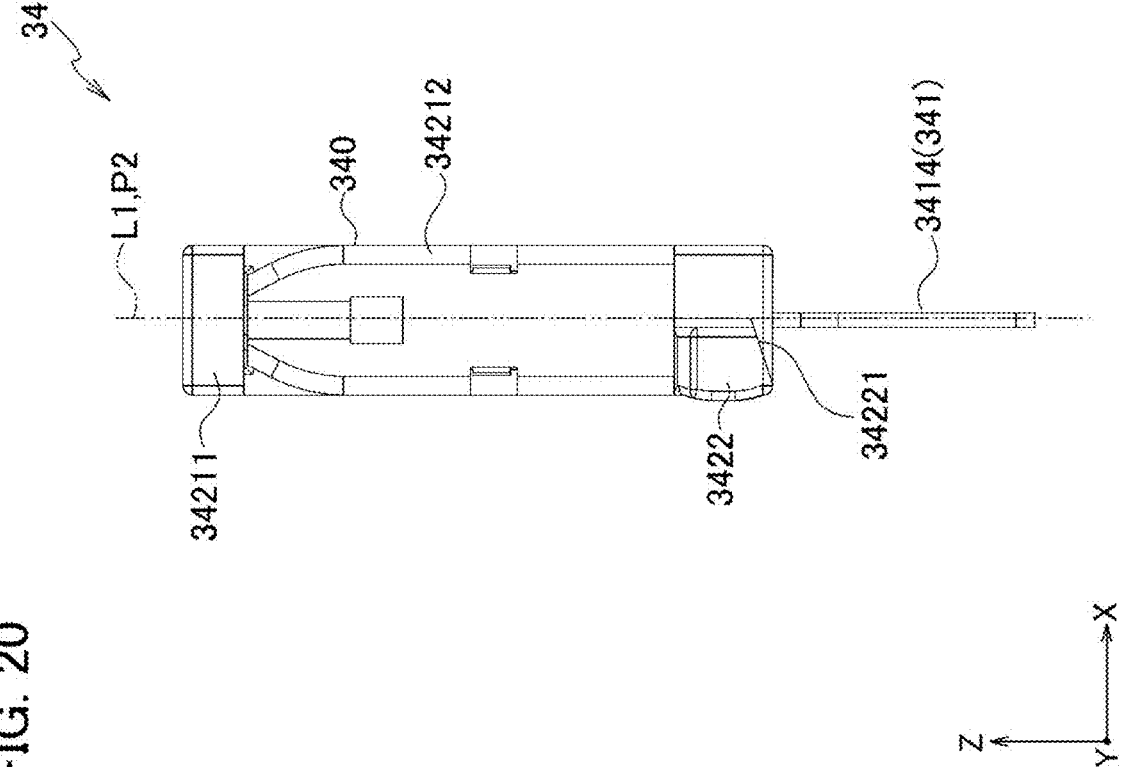
FIG. 20 is a side view on the other side illustrating an example of the multi-fusible link unit according to the embodiment.

Specifically, as illustrated in FIG. 14, the base 311 has an approximately rectangular parallelepiped shape, and a head housing space 3111 for housing and holding a head 3121 of the power source bolt (power source terminal) 312 is formed in the base 311 such that the head housing space 3111 opens on one side in the Y direction (width direction: second direction). When the head 3121 of the power source bolt (power source terminal) 312 is housed and held in the head housing space 3111 from the side, a shaft 3122 of the power source bolt (power source terminal) 312 projects upward in the Z direction (up-down direction: first direction). By connecting the electric wire 81 to the shaft 3122, the power source 8 is electrically connected to the power source distribution circuit component 30 via the electric wire 81.

Figure 13:
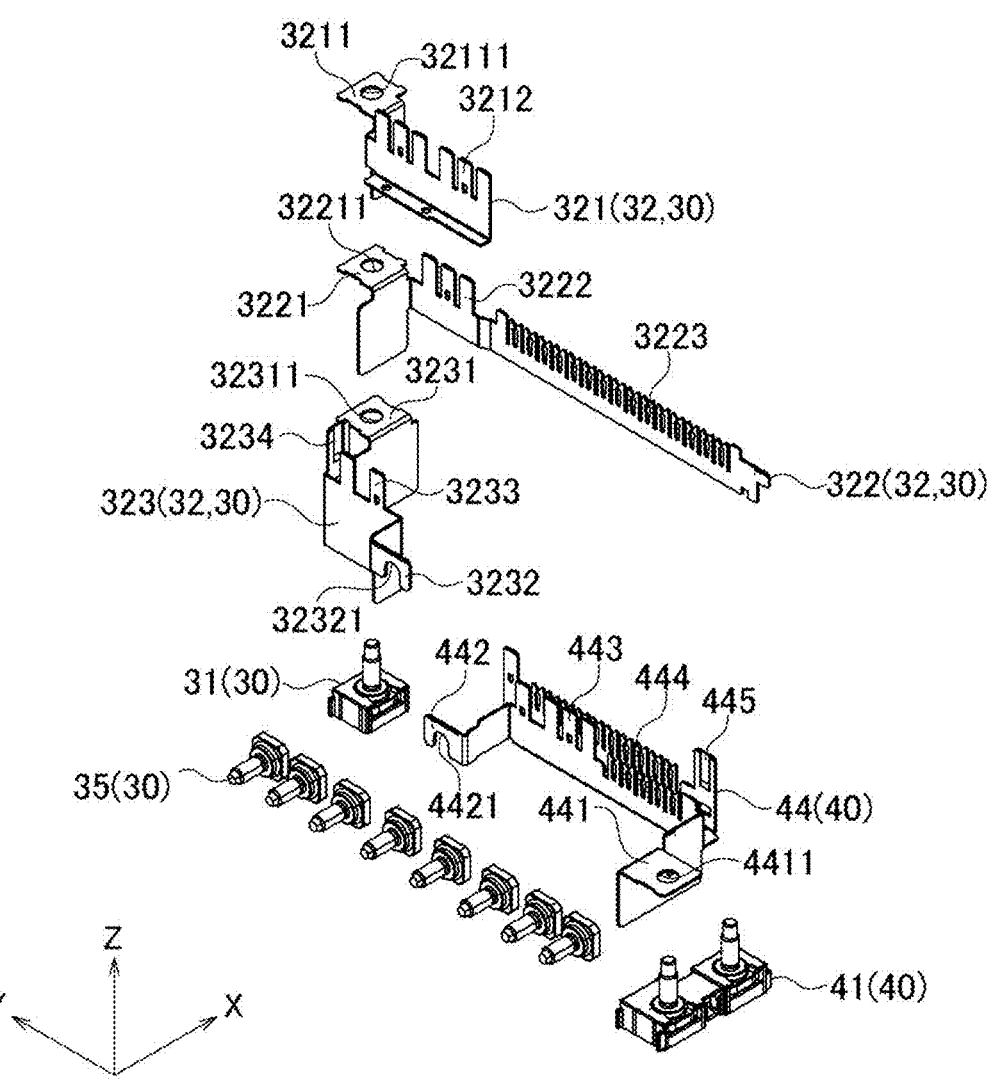
FIG. 13 is an exploded perspective view illustrating some components inserted into an example of the case from below among the components constituting part of an example of the base unit according to the embodiment.

The power source distribution circuit component 30 includes the power source distribution bus bar 32 electrically connected to the power source bolt (power source terminal) 312. As illustrated in FIG. 13, in the present embodiment, the power source distribution bus bar 32 includes a first power source distribution bus bar 321, a second power source distribution bus bar 322, and a third power source distribution bus bar 323. These power source distribution bus bars can be formed of a metallic material having conductivity and rigidity, for example. In the present embodiment, each power source bus bar is formed by punching a single conductive metal plate such that the outer shape of the material is formed into a predetermined shape, and appropriately applying plastic work such as bending work to the punched workpiece.

The first power source distribution bus bar 321 has a connection piece 3211 connected to the power source bolt (power source terminal) 312, and a through hole 32111 is formed in the connection piece 3211. The first power source distribution bus bar 321 is electrically connected to the power source bolt (power source terminal) 312 by inserting a shaft 3122 of the power source bolt (power source terminal) 312 into the through hole 32111. Further, the first power source distribution bus bar 321 has a band-plate-shaped terminal 3212, and the relay 331 as the electronic component 33 is electrically connected to the band-plate-shaped terminal 3212.

The second power source distribution bus bar 322 has a connection piece 3221 connected to the power source bolt (power source terminal) 312, and a through hole 32211 is formed in the connection piece 3221. The second power source distribution bus bar 322 is electrically connected to the power source bolt (power source terminal) 312 by inserting the shaft 3122 of the power source bolt (power source terminal) 312 into the through hole 32211. Further, the second power source distribution bus bar 322 has a band-plate-shaped terminal 3222, and the relay 331 as the electronic component 33 is electrically connected to the band-plate-shaped terminal 3222. Further, the second power source distribution bus bar 322 has the tuning fork terminal 3223, and the fuse 332 as the electronic component 33 is electrically connected to the tuning fork terminal 3223.

Further, the third power source distribution bus bar 323 has a one-side connection piece 3231 connected to the power source bolt (power source terminal) 312, and a through hole 32311 is formed in the one-side connection piece 3231. The third power source distribution bus bar 323 is electrically connected to the power source bolt (power source terminal) 312 by inserting the shaft 3122 of the power source bolt (power source terminal) 312 into the through hole 32311.

Further, the third power source distribution bus bar 323 has the other-side connection piece 3232 connected to the electric wire connection bolt 35, and a notch 32321 opening downward is formed in the other-side connection piece 3232. The third power source distribution bus bar 323 is electrically connected to the electric wire connection bolt 35 by inserting the shaft 352 of the electric wire connection bolt 35 into the notch 32321. At this time, a power source connection portion 3411 of the multi-fusible link unit 34 is also electrically connected to the electric wire connection bolt 35. Thus, the current passing through the third power source distribution bus bar 323 is introduced into the multi-fusible link unit 34 via the other-side connection piece 3232. The current passing through the multi-fusible link unit 34 is then distributed to each electric wire connection bolt 35 through each fusible link portion 3413.

Further, the third power source distribution bus bar 323 has a band-plate-shaped terminal 3233, and the relay 331 as the electronic component 33 is electrically connected to the band-plate-shaped terminal 3233. In addition, the third power source distribution bus bar 323 has the band-plate-shaped terminal 3234, and the other electronic component 333 is electrically connected to the band-plate-shaped terminal 3234.

As described above, the battery circuit component 40 includes the battery circuit terminal block 41. The battery circuit terminal block 41 includes the first bolt (battery connection terminal) 412 electrically connected to the battery 6 via the electric wire 61, and the second bolt (load connection terminal) 413 connected to the load 7 via the electric wire 71. Further, the battery circuit terminal block 41 includes a base 411 for holding the first bolt (battery connection terminal) 412 and the second bolt (load connection terminal) 413.

Specifically, as illustrated in FIG. 14, the base 411 has an approximately rectangular parallelepiped shape. A first head housing space 4111 for housing and holding a head 4121 of the first bolt (battery connection terminal) 412 is formed in the base 411 such that the first head housing space 4111 opens on one side in the Y direction (width direction: second direction). In addition, a second head housing space 4112 for housing and holding a head 4131 of the second bolt (battery connection terminal) 413 is formed in the base 411 such that the second head housing space 4112 opens on one side in the Y direction (width direction: second direction). When the head 4121 of the first bolt (battery connection terminal) 412 is housed and held in the first head housing space 4111 from the side, a shaft 4122 of the first bolt (battery connection terminal) 412 projects upward in the Z direction (up-down direction: first direction). Similarly, when the head 4131 of the second bolt (load connection terminal) 413 is housed and held in the second head housing space 4112 from the side, a shaft 4132 of the second bolt (load connection terminal) 413 projects upward in the Z direction (up-down direction: first direction). By connecting the electric wire 61 to the shaft 4122 of the first bolt (battery connection terminal) 412, the battery 6 is electrically connected to the battery circuit component 40 via the electric wire 61. In addition, by connecting the electric wire 71 to the shaft 4132 of the second bolt (load connection terminal) 413, the load 7 is electrically connected to the battery circuit component 40 via the electric wire 71.

Further, in the present embodiment, the battery circuit component 40 includes a battery side power source distribution circuit for distributing power source supplied from the battery 6. That is, the battery circuit 4 is configured to have a power source distribution function. The battery circuit 4 may not have a power source distribution function.

In the present embodiment, as illustrated in FIG. 13, the battery circuit component 40 includes the battery side power source distribution bus bar 44 electrically connected to the second bolt (load connection terminal) 413. The battery side power source distribution bus bar 44 may be formed of a metal material having conductivity and rigidity, for example. In the present embodiment, the battery side power source distribution bus bar 44 is formed by punching a single conductive metal plate such that the outer shape of the material is formed into a predetermined shape, and appropriately applying plastic work such as bending work to the punched workpiece.

The battery side power source distribution bus bar 44 has a one-side connection piece 441 connected to the second bolt (load connection terminal) 413, and a through hole 4411 is formed in the one-side connection piece 441. The battery side power source distribution bus bar 44 is electrically connected to the second bolt (load connection terminal) 413 by inserting the shaft 4132 of the second bolt (load connection terminal) 413 into the through hole 4411.

Further, the battery side power source distribution bus bar 44 has the other-side connection piece 442 connected to the electric wire connection bolt 35, and a notch 4421 opening downward is formed in the other-side connection piece 442. The battery side power source distribution bus bar 44 is electrically connected to the electric wire connection bolt 35 by inserting the shaft 352 of the electric wire connection bolt 35 into the notch 4421. At this time, the power source connection portion 3411 of the multi-fusible link unit 34 is also electrically connected to the electric wire connection bolt 35. Thus, the current passing through the battery side power source distribution bus bar 44 is introduced into the multi-fusible link unit 34 via the other-side connection piece 442. The current passing through the multi-fusible link unit 34 is distributed to each electric wire connection bolt 35 through each fusible link portion 3413. In the present embodiment, the electric wire connection bolt 35 to which the other-side connection piece 442 is connected is different from the electric wire connection bolt 35 to which the other-side connection piece 3232 is connected.

Further, the battery side power source distribution bus bar 44 has the band-plate-shaped terminal 443, and the relay 451 as the electronic component 45 is electrically connected to the band-plate-shaped terminal 443. In addition, the battery side power source distribution bus bar 44 has the tuning fork terminal 444, and the fuse 452 as the electronic component 45 is electrically connected to the tuning fork terminal 444. In addition, the battery side power source distribution bus bar 44 has the band-plate-shaped terminal 445, and the other electronic component 453 is electrically connected to the band-plate-shaped terminal 445 (see FIGS. 11 to 13).

As described above, the battery circuit component 40 includes the battery circuit bus bar 42 for electrically connecting the first bolt (battery connection terminal) 412 and the second bolt (load connection terminal) 413.

Next, a specific configuration of the multi-fusible link unit 34 and an insertion method into the case 2 will be described.

The multi-fusible link unit 34 is a member inserted and held in the housing space 271 which opens in the upper side (one side) in the Z direction (up-down direction: first direction), and is unitized as one component. Thus, a plurality of fusible links (fusible link portions 3413) can be inserted and held in the case 2 collectively. In the present embodiment, the multi-fusible link unit 34 moves from the upper side of the case 2 to the lower side thereof in a relative manner, and thus it is housed in the housing space 271 and inserted and held in the case 2.

As illustrated in FIGS. 15 to 22, the multi-fusible link unit 34 includes a bus bar 341 having the power source connection portion 3411 and a plurality of load connection portions 3414, and capable of distributing power source. The multi-fusible link unit 34 also includes a plurality of fusible link portions 3413 interposed between the power source connection portion 3411 and the load connection portion 3414, and a cover 342 for holding the bus bar 341.

In the present embodiment, the bus bar 341 is formed by punching a single conductive metal plate such that the outer shape of the material is formed into a predetermined shape, and appropriately applying plastic work such as bending work to the punched workpiece. The plurality of fusible link portions 3413 are formed in the bus bar 341.

Thus, the power source connection portion 3411, the plurality of load connection portions 3414, and the plurality of fusible link portions 3413 are formed only by forming the bus bar 341. Accordingly, it is not necessary to attach the respective fusible links to the bus bar for unitization, thereby reducing the number of components and enabling cost reduction. Further, by forming the plurality of fusible link portions 3413 in one plate-like bus bar 341, the bus bar 341 having the power source connection portion 3411, the plurality of load connection portions 3414, and the plurality of fusible link portions 3413 can be obtained at a lower cost. In addition, the multi-fusible link unit 34 can be reduced in thickness.

Figure 21:
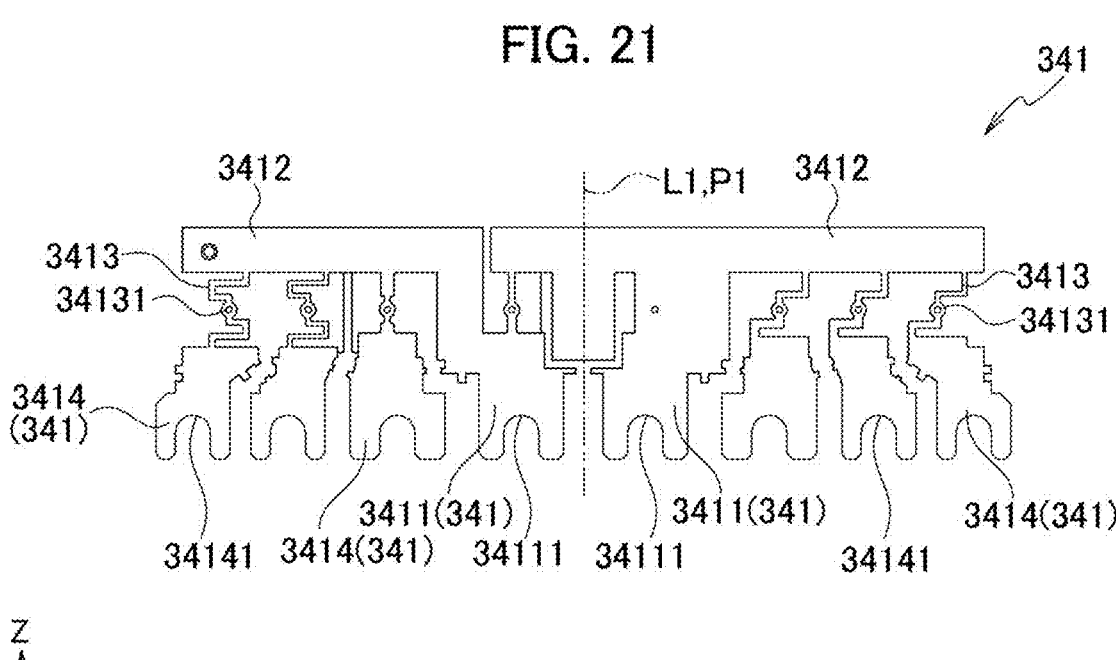
FIG. 21 is a front view illustrating an example of a bus bar provided in an example of the multi-fusible link unit according to the embodiment.
Figure 21:
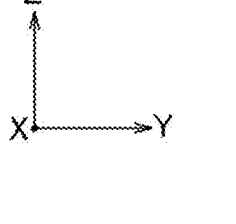
Figure 22:
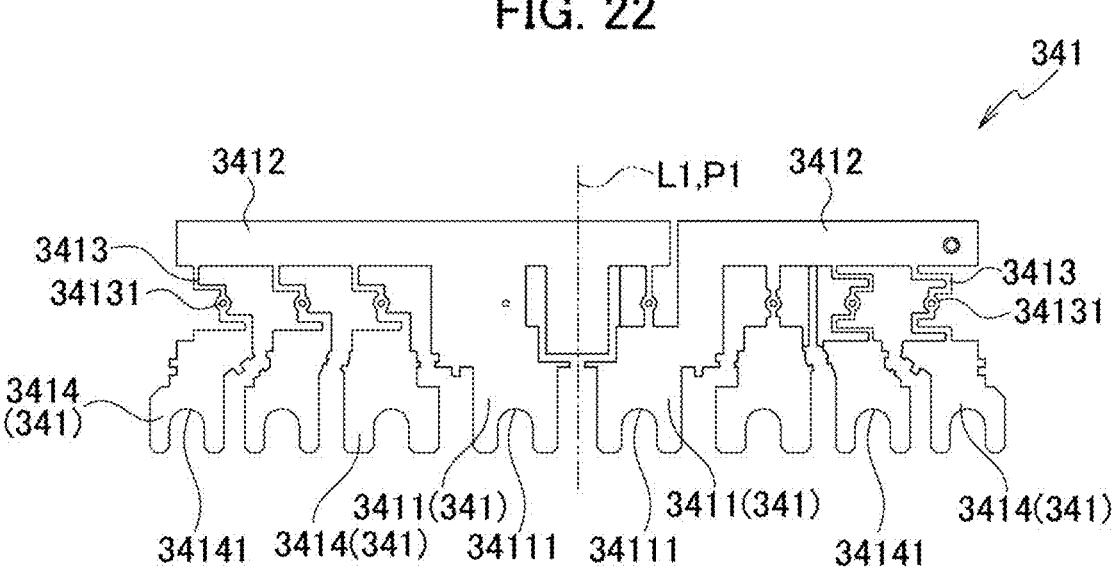
FIG. 22 is a back view illustrating an example of the bus bar provided in an example of the multi-fusible link unit according to an embodiment.
Figure 22:
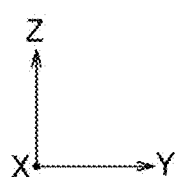

As illustrated in FIGS. 21 and 22, eight connection pieces are formed in the bus bar 341, and each connection piece is electrically connected to the electric wire connection bolt 35. Thus, in the present embodiment, the bus bar 341 is provided with eight load connection portions 3414. In the present embodiment, a notch 34141 is formed in each of the load connection portions 3414, and the bus bar 341 is electrically connected to the electric wire connection bolt 35 by inserting the shaft 352 of the electric wire connection bolt 35 into the notch 34141.

Further, among the eight load connection portions 3414, the respective two load connection portions 3414 positioned at the center in the Y direction is electrically connected to the electric wire connection bolt 35 to which the other-side connection piece 442 is connected, and the electric wire connection bolt 35 to which the other-side connection piece 3232 is connected. Accordingly, the two load connection portions 3414 positioned at the center in the Y direction also function as the power source connection portions 3411 into which current is introduced when the power source is distributed by the multi-fusible link unit 34. Thus, in the present embodiment, the multi-fusible link unit 34 is configured to distribute the current supplied from the battery 6, and distribute the current supplied from the power source 8. Accordingly, the notch 34141 of the two load connection portions 3414 that also function as the power source connection portions 3411 corresponds to the notch 34111 of the power source connection portions 3411.

In the bus bar 341, the eight load connection portions 3414 are connected by the connection portions 3412, and the fusible link portions (fuse portions) 3413 are formed between the load connection portions 3414 and the connection portions 3412. The respective fusible link portions (fuse portions) 3413 have a fusible body 34131, and when a current exceeding a predetermined value is supplied to the respective fusible link portions (fuse portions) 3413, the fusible body 34131 is melted by heat.

Meanwhile, the cover 342 has a cover body 3421, and the bus bar 341 is held in the cover body 3421 in a state in which the plurality of fusible link portions 3413 are covered by the cover body 3421. In the present embodiment, the cover body 3421 has a frame 34211 for holding the connection portion of the bus bar 341 and the base end side of each load connection portion 3414, and a window 34212 attached to the frame 34211 and covering the fusible link portion 3413. In the present embodiment, the window 34212 is formed of transparent or translucent resin, and the fusible link portion 3413 is made visible in a state in which the cover 342 is attached to the bus bar 341. In addition, a notch 213 is formed on the front wall 21 (peripheral wall 211) of the wall 21 defining the housing space 271 of the case 2, and thus the fusible link portion 3413 can be visualized even in a state in which the multi-fusible link unit 34 is housed in the housing space 271.

The cover body 3421 has an approximately thin plate shape with a thin thickness in the X direction, and is formed so as to have an approximately twice-rotation symmetrical shape with respect to an imaginary line L1 extending in the Z direction. Further, the cover body 3421 has an approximately plane-symmetrical shape with respect to a first imaginary plane P1, which is a plane orthogonal to the Y direction, and also has an approximately plane-symmetrical shape with respect to a second imaginary plane P2, which is a plane orthogonal to the X direction.

By attaching the cover body 3421 described above to the bus bar 341, a main body 340 (portions other than the projection 3422 described later in the multi-fusible link unit 34) is formed. In the present embodiment, the main body 340 is also formed so as to have an approximately twice-rotation symmetrical shape with respect to the imaginary line L1 extending in the Z direction. Further, the main body 340 has an approximately plane-symmetrical shape with respect to the first imaginary plane P1, which is a plane orthogonal to the Y direction, and also has an approximately plane-symmetrical shape with respect to the second imaginary plane P2, which is a plane orthogonal to the X direction. That is, the portions (eight load connection portions 3414) exposed from the cover body 3421 of the bus bar 341 also have an approximately twice-rotation symmetrical shape with respect to the imaginary line L1, and have an approximately plane-symmetrical shape with respect to the first imaginary plane P1.

Thus, the external appearance of the main body 340 is a shape that can be inserted into the housing space 271 even in a state in which the main body 340 rotates 180 degrees about the Z direction (in a state that is inverted from a normal position to an inverse position and from an inverse position to a normal position).

In the present embodiment, an allowable current value of the fusible link portion 3413 is set according to the electric wire 91 to be connected, and the fusible link portion 3413 having a different allowable current value exists among the plurality of fusible link portions 3413. When the fusible link portions 3413 have the same shapes, the allowable current values are also the same, and when having the different shapes, the allowable current values are also different. This makes it possible to check the allowable current value of each fusible link portion 3413 by visually observing the shapes of the fusible link portions 3413.

Further, in the present embodiment, as described above, eight load connection portions 3414 have a twice-rotation symmetrical shape with respect to the imaginary line L1 extending in the Z direction, and have a plane-symmetrical shape with respect to the first imaginary plane P1, which is a plane orthogonal to the Y direction.

In contrast, the fusible link portions 3413 have an asymmetrical shape with respect to the imaginary line L1, and also have an asymmetrical shape with respect to the first imaginary plane P1. For this reason, the arrangement order of the allowable current values of the fusible link portions 3413 is different between the normal position and the inverse position (see FIGS. 21 and 22).

As described above, when the plurality of fusible link portions 3413 that change the arrangement order of the allowable current values when inverted are formed in the plate-like bus bar 341, the multi-fusible link unit 34 corresponding to two types of the arrangement order can be formed. Specifically, two types of multi-fusible link units 34 can be formed: the multi-fusible link unit 34 that a state illustrated in FIG. 21 is a normal position, and the multi-fusible link unit 34 that a state illustrated in FIG. 22 is a normal position.

Here, in the present embodiment, it is possible to suppress the multi-fusible link unit 34 to be erroneously inserted into the case 2, and also possible to further improve the insertion work of the multi-fusible link unit 34 into the housing space 271.

Specifically, the projection 3422 is formed at least on the main body 340 which is one of the main body 340 and the power source distribution unit holding portion (holding portion) 27. In the present embodiment, a pair of projections 3422 is formed at both ends in the Y direction in the lower end of the cover body 3421 so as to project from the rear half in the X direction to the outside in the Y direction.

Figure 23:
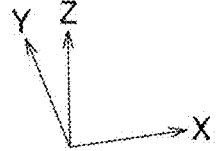
FIG. 23 is a perspective view illustrating an enlarged example of a restriction wall according to the embodiment.
Figure 24:
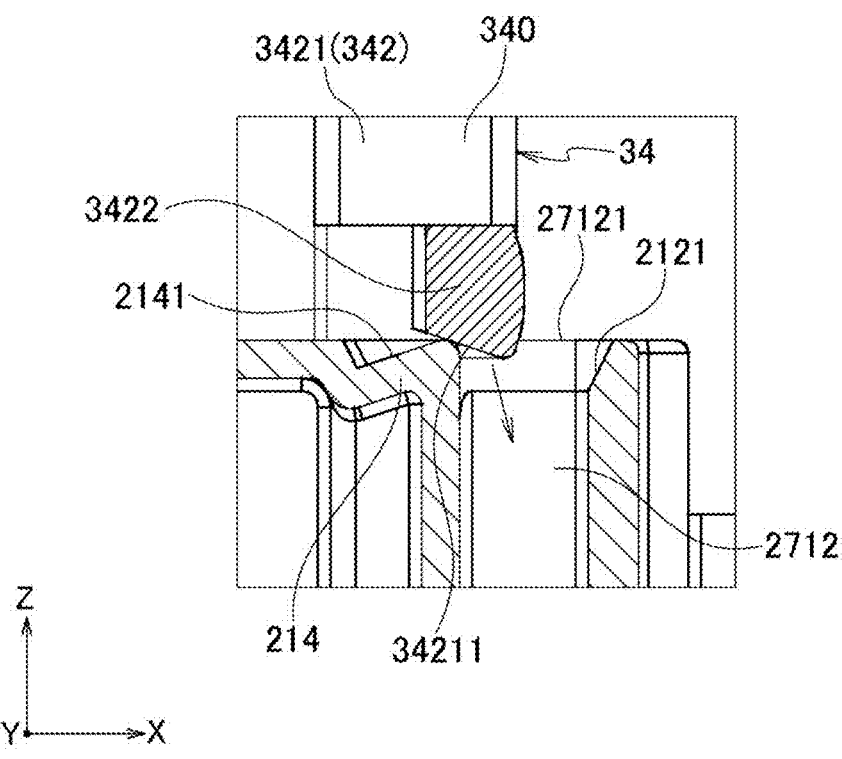
FIG. 24 is a diagram for explaining a state in which a projection is guided into a groove when an example of the multi-fusible link unit according to the embodiment is inserted into a housing space in a state of a normal position.

A groove 2712 is formed at least in the power source distribution unit holding portion (holding portion) 27 which is the other of the main body 340 and the power source distribution unit holding portion (holding portion) 27 (see FIGS. 23 and 24). The groove 2712 is formed in a pair so as to communicate with both ends of the main body housing space 2711 in the Y direction into which the main body 340 is inserted at the rear side in the X direction. When the multi-fusible link unit 34 is inserted into the housing space 271 in a state of the normal position, the projection 3422 is inserted into the groove 2712.

Figure 25:
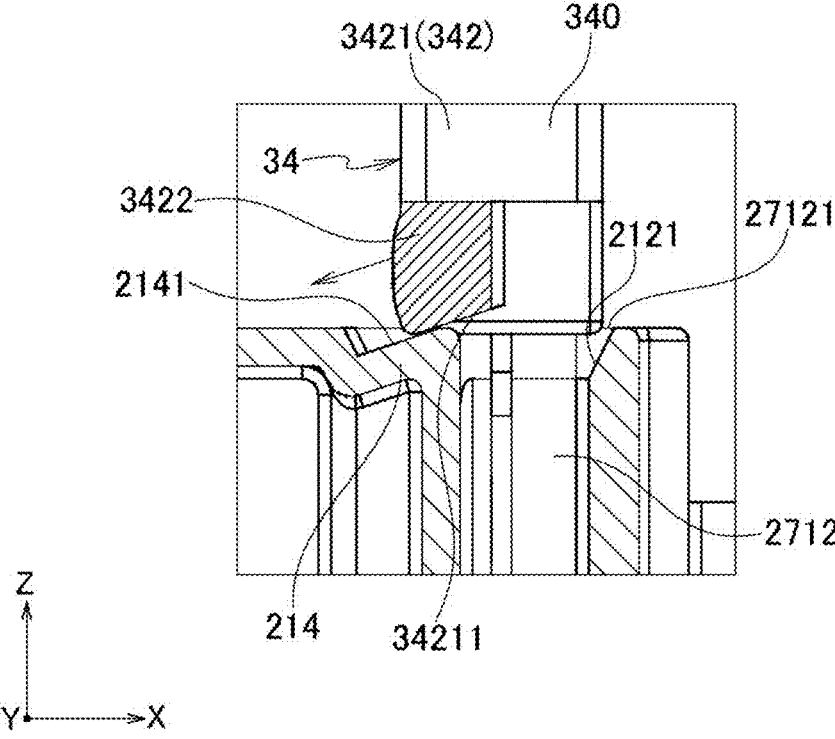
FIG. 25 is a diagram for explaining a state in which the projection moves in a direction away from the groove by the restriction wall when an example of the multi-fusible link unit according to the embodiment is inserted into the housing space in a state of an inverse position.
Figure 26:
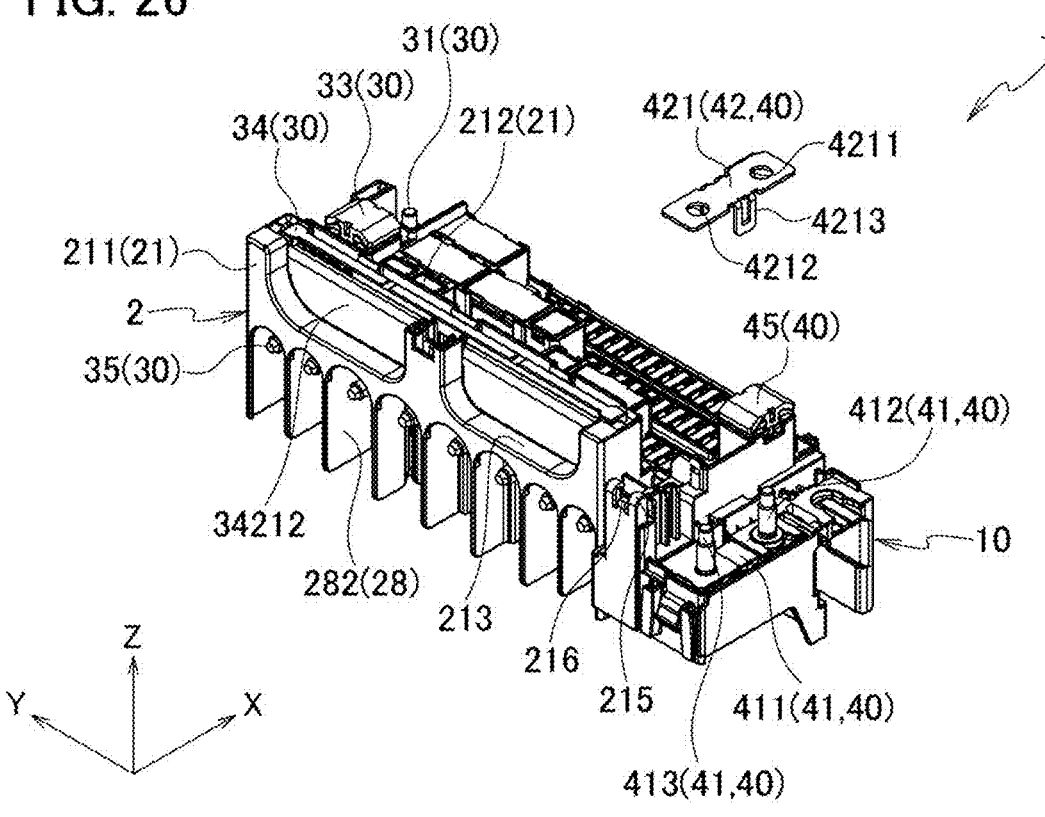
FIG. 26 is a diagram illustrating an example of an assembly method of the electrical connection structure without the relief terminal.

Further, a restriction wall 214 which interferes with the projection 3422 when the multi-fusible link unit 34 is inserted into the housing space 271 in a state of the inverse position is formed in the power source distribution unit holding portion (holding portion) 27 (see FIG. 25). The restriction wall 214 is formed on the wall 21 (peripheral wall 211) defining the housing space 271, and the respective restriction walls 214 are formed at the front of the openings 27121 of the pair of grooves 2712 so as to be arranged with the opening 27121 in the X direction.

A projection side inclined surface 34221 capable of guiding the projection 3422 into the groove 2712 by coming into contact with the restriction wall 214 when the multi-fusible link unit 34 is inserted into the housing space 271 in the normal position is formed in the projection 3422. Specifically, the projection side inclined surface 34221 is formed so as to be inclined backward and downward to the front of the lower end of the projection 3422.

As described above, in the present embodiment, the multi-fusible link unit 34 has the main body 340 which is formed so as to have an approximately twice-rotation symmetrical shape with respect to the imaginary line L1 extending in the Z direction (up-down direction: first direction).

The projection 3422 is formed on the main body 340. Further, the groove 2712 into which the projection 3422 is allowed to be inserted when the multi-fusible link unit 34 is normally inserted, and the restriction wall 214 which interferes with the projection 3422 when the multi-fusible link unit 34 is inversely inserted are formed on the power source distribution unit holding portion (holding portion) 27.

That is, the main body 340 has a shape that can be inversely inserted, and the projection 3422 interferes with the restriction wall 214 when the multi-fusible link unit 34 is inversely inserted. Thus, the multi-fusible link unit 34 cannot be housed in the housing space 271. When the multi-fusible link unit 34 is normally inserted, the projection 3422 is inserted into the groove 2712 without interfering with the restriction wall 214, and thus the multi-fusible link unit 34 can be housed in the housing space 271. Here, "the multi-fusible link unit 34 is normally inserted" means that the multi-fusible link unit 34 is inserted into the housing space 271 in a normal state (a state of a normal position). In contrast, "the multi-fusible link unit 34 is inversely inserted" means that that the multi-fusible link unit 34 is inserted into the housing space 271 in a state (a state of an inverse position) in which the multi-fusible link unit 34 rotates 180 degrees about an axis in the Z direction (up-down direction: first direction) with respect to the normal position.

As described above, in the electrical connection structure 1 according to the present embodiment, the main body 340 has an approximately twice-rotation symmetrical shape with respect to the imaginary line L1 extending in the Z direction (up-down direction: first direction), thereby suppressing the shape of the main body 340 to be complicated. This makes it possible to manufacture the multi-fusible link unit 34 at a lower cost and more easily.

In addition, the main body 340 has a shape that can be inversely inserted, and the projection 3422, the restriction wall 214 and the groove 2712 restrict the multi-fusible link unit 34 to be inversely inserted. Thus, even in the case where the multi-fusible link unit 34 has a shape that can be inversely inserted, it is possible to suppress the multi-fusible link unit 34 to be inversely inserted more reliably.

The plurality of fusible link portions 3413 may have different allowable current values. In the case where the fusible link portions 3413 have different allowable current values, the arrangement order of allowable current values may be different between the state where the multi-fusible link unit 34 is in the normal position and the state where the multi-fusible link unit 34 is in the inverse position.

For this reason, in the case where the main body 340 has an approximately twice-rotation symmetrical shape in appearance and the arrangement relationship of the plurality of fusible link portions 3413 is asymmetric, if the multi-fusible link unit 34 is made possible to be inversely inserted, an electric wire not corresponding to the fusible link portion 3413 may be erroneously connected. For example, an electric wire having a low allowable current value may be erroneously connected to the fusible link portion 3413 having a high allowable current value. Thus, if an electric wire having a low allowable current value is connected to the fusible link portion 3413 having a high allowable current value, the fusible link portion 3413 may not be melted even if an overcurrent is supplied to the electric wire, which may cause the overcurrent to be supplied to the electric wire continuously.

However, in the case where the electrical connection structure 1 described in the present embodiment is adopted, even when the main body 340 has a shape that can be inversely inserted, it is possible to suppress the multi-fusible link unit 34 to be inversely inserted. This makes it possible to more reliably suppress an erroneous connection of the electric wire not corresponding to the fusible link portion 3413.

Further, in the electrical connection structure 1 described in the present embodiment, the projection side inclined surface 34221 capable of guiding the projection 3422 into the groove 2712 is formed in the projection 3422. That is, the projection side inclined surface 34221 capable of guiding the projection 3422 into the groove 2712 by coming into contact with the restriction wall 214 when the multi-fusible link unit 34 is inserted into the housing space 271 in a state of the normal position is formed in the projection 3422. Thus, the multi-fusible link unit 34 can be housed in the housing space 271 more easily.

As described above, the electrical connection structure 1 according to the present embodiment makes it possible to manufacture the multi-fusible link unit 34 at a lower cost and more easily, and to suppress the multi-fusible link unit 34 to be erroneously inserted into the case 2, and to further improve the insertion work.

Further, in the present embodiment, a restriction wall side inclined surface 2141 inclining forward and downward in the X direction is formed on the restriction wall 214. Thus, when the multi-fusible link unit 34 is inserted into the housing space 271 in a state of the inverse position, the projection side inclined surface 34221 comes into contact with the restriction wall side inclined surface 2141, thereby making it possible to move the projection 3422 in the direction away from the groove 2712.

That is, the restriction wall side inclined surface 2141 is formed on the restriction wall 214, and when the multi-fusible link unit 34 is inversely inserted, the projection 3422 moves away from the groove 2712 by bringing the projection side inclined surface 34221 into contact with the restriction wall side inclined surface 2141.

Thus, when the projection 3422 interferes with the restriction wall 214 by inversely inserting the multi-fusible link unit 34, it is possible to move the projection 3422 away from the groove 2712 by moving the projection side inclined surface 34221 along the restriction wall side inclined surface 2141. By moving the projection 3422 away from the groove 2712, it is possible to more reliably suppress the projection 3422 to be erroneously inserted into the groove 2712 when the multi-fusible link unit 34 is inversely inserted. As a result, it is possible to prevent the multi-fusible link unit 34 from being forcibly pushed into the housing space 271 when the multi-fusible link unit 34 is inversely inserted. Accordingly, it is possible to more reliably suppress the multi-fusible link unit 34 to be erroneously inserted into the case 2.

In the present embodiment, when the multi-fusible link unit 34 is inserted into the housing space 271 in a state of the inverse position, the projection side inclined surface 34221 and the restriction wall side inclined surface 2141 have surface contact with each other.

This makes it possible to disperse the stress generated when the projection 3422 interferes with the restriction wall 214 caused by inversely inserting the multi-fusible link unit 34. That is, this makes it possible to suppress a partial concentration of the stress generated when the projection 3422 interferes with the restriction wall 214 caused by inversely inserting the multi-fusible link unit 34. Accordingly, it is possible to more reliably suppress the projection 3422 and the restriction wall 214 to be broken when the multi-fusible link unit 34 is inversely inserted.

In the present embodiment, a partition wall side inclined surface 2121 is also formed so as to be inclined forward and downward on the rear wall 21 (partition wall 212) defining the housing space 271, and the partition wall side inclined surface 2121 also has a function of guiding the projection 3422 into the groove 2712.

Further, the present embodiment makes it possible to provide the electrical connection structure 1 which can be compatible with a variety of vehicle specifications at a lower cost. That is, the electrical connection structure 1 capable of handling the presence or absence of the relief terminal 43 can be manufactured at a lower cost.

Figure 5:
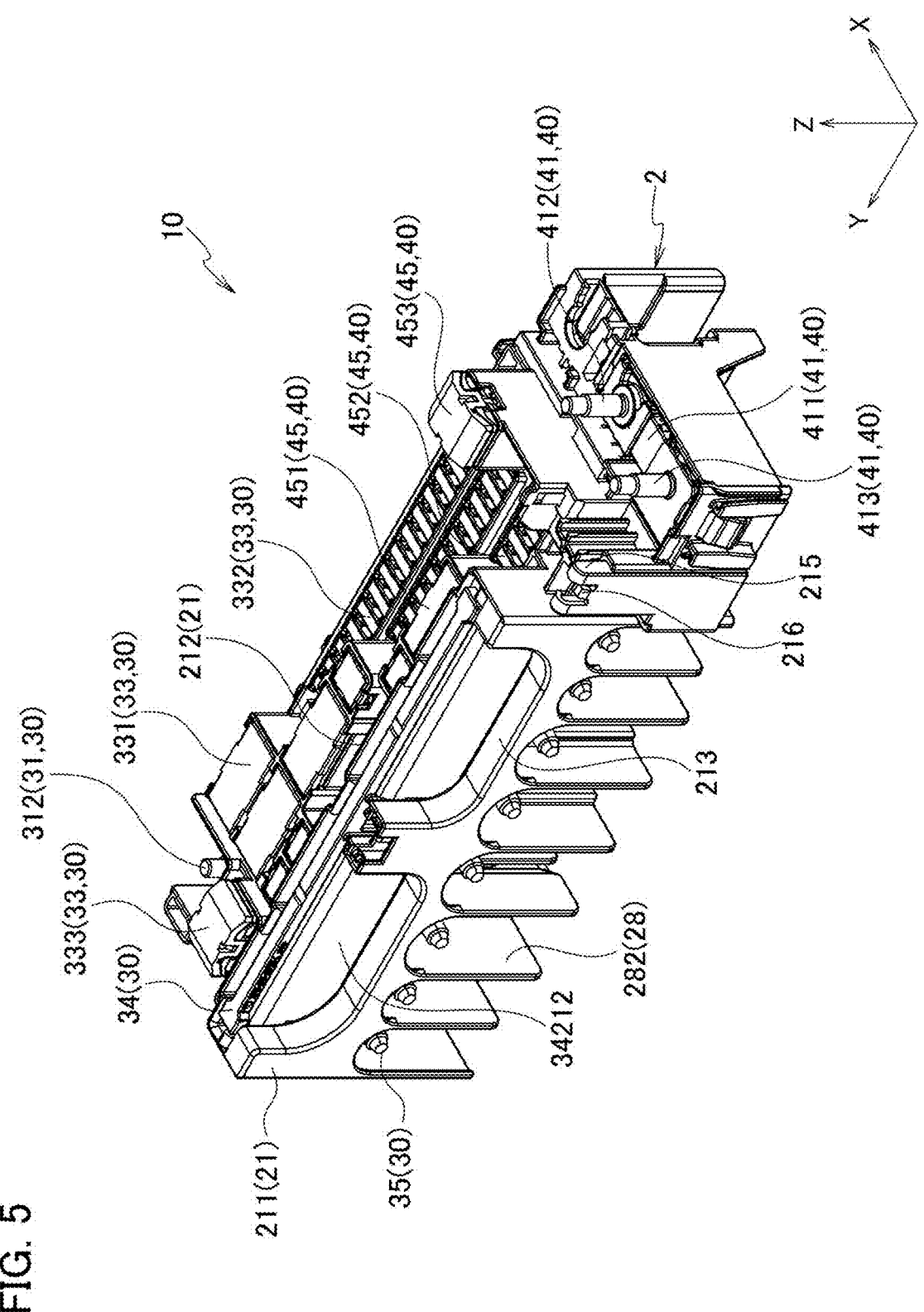
FIG. 5 is a perspective view of an example of a base unit according to an embodiment viewed from one direction.
Figure 6:
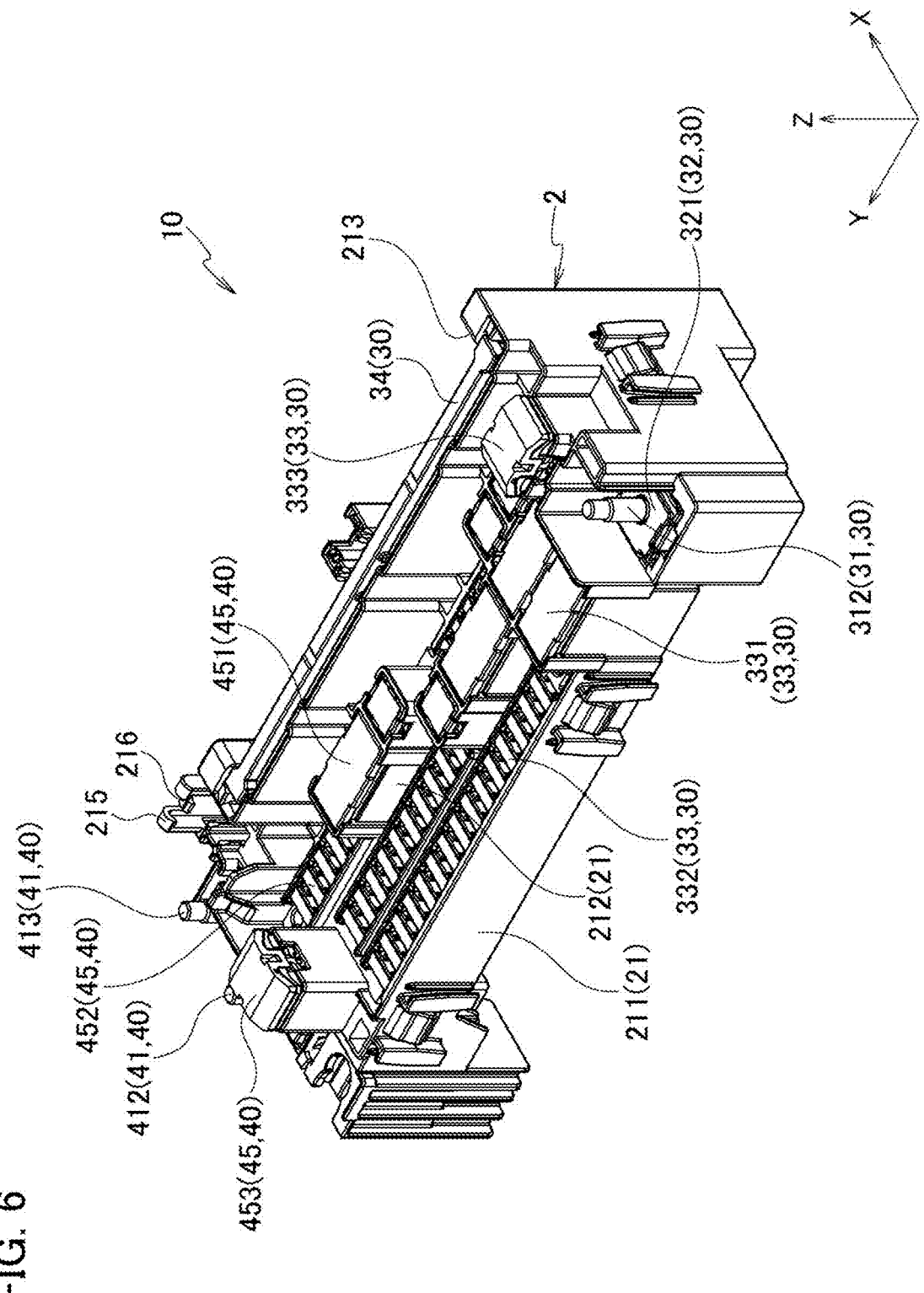
FIG. 6 is a perspective view of an example of the base unit according to the embodiment viewed from another direction.
Figure 7:
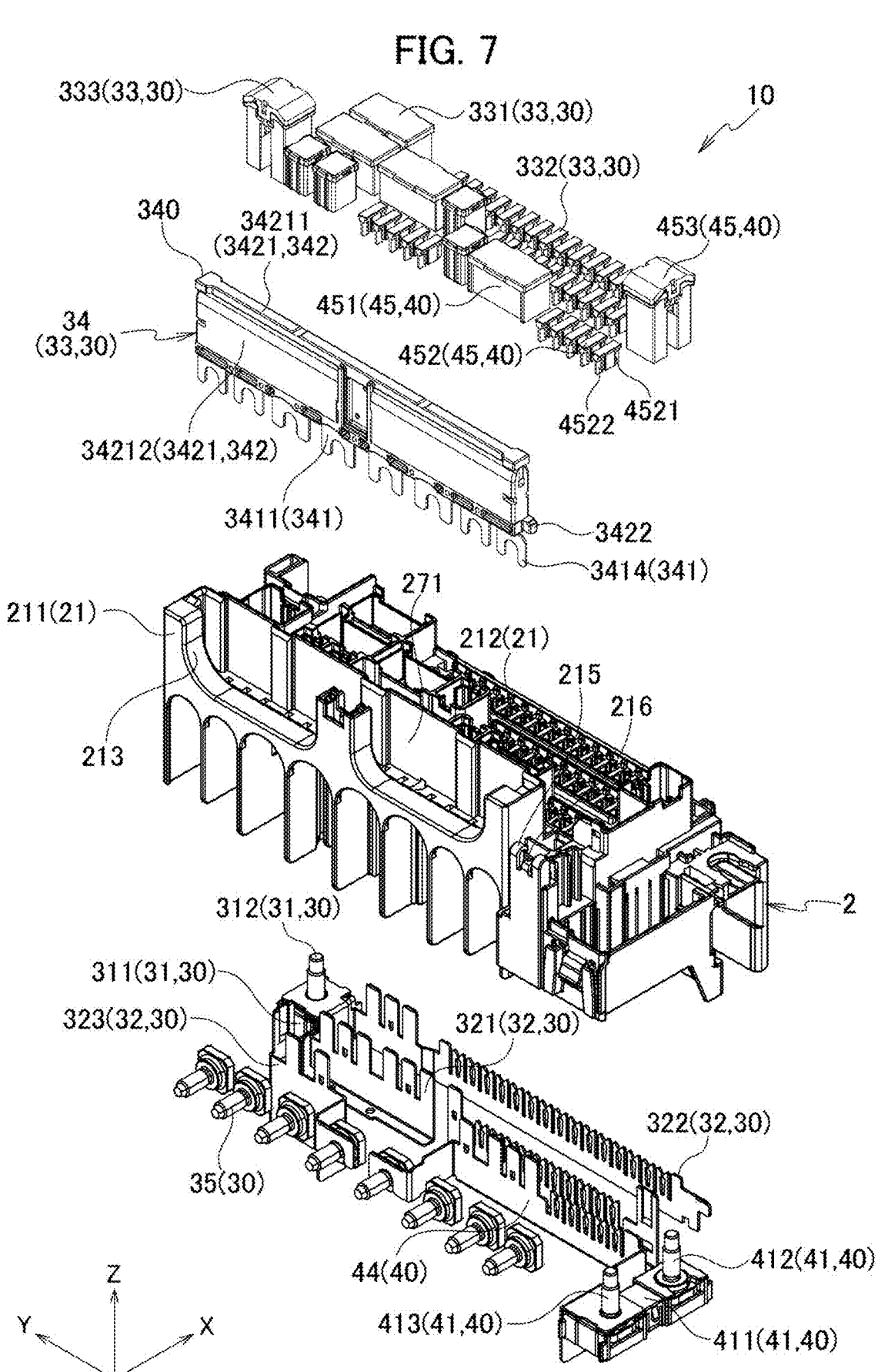
FIG. 7 is an exploded perspective view of an example of the base unit according to the embodiment viewed from one direction.
Figure 8:
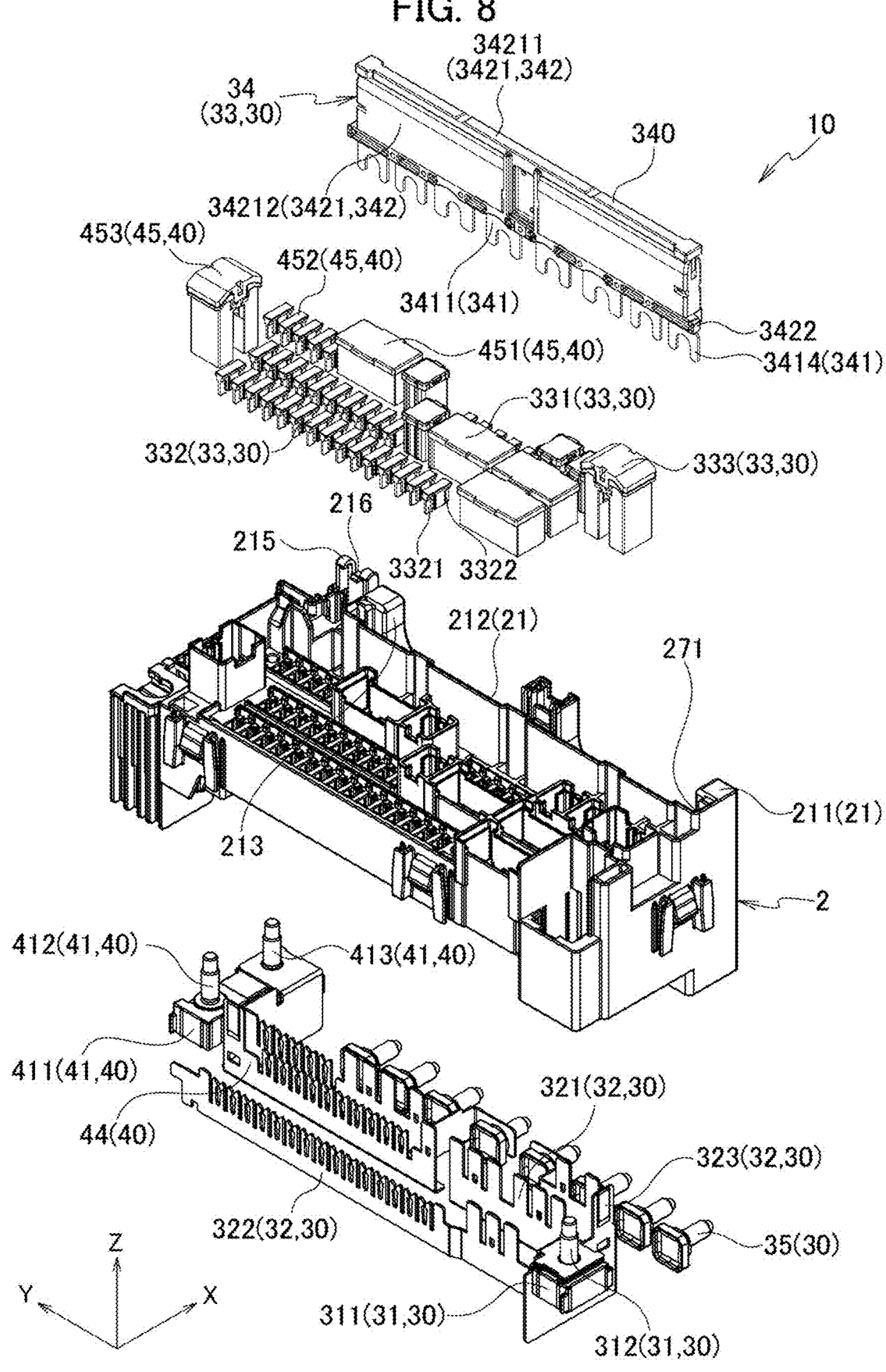
FIG. 8 is an exploded perspective view of the base unit according to the embodiment viewed from another direction.

Specifically, the battery circuit component 40 other than the power source distribution circuit component 30 and the battery circuit bus bar 42 is held in the case 2 holds, and thus the base unit 10 illustrated in FIGS. 5 and 6 is formed.

The base unit 10 is used regardless of the presence or absence of the relief terminal 43. That is, the base unit 10 illustrated in FIGS. 5 and 6 is used even in the case of the electrical connection structure 1 without the relief terminal 43, or the electrical connection structure 1 provided with the relief terminal 43. This makes it possible to use as many components used in common as possible.

The battery circuit bus bar 42 includes a normal bus bar 421 without the relief terminal 43, and a relief terminal-provided bus bar 422 having the relief terminal 43. Thus, in the case of the electrical connection structure 1 without the relief terminal, the normal bus bar 421 is normally mounted to the first bolt (battery connection terminal) 412. In contrast, in the case of the electrical connection structure 1 provided with the relief terminal 43, at least the relief terminal-provided bus bar 422 is mounted to the first bolt (battery connection terminal) 412.

Thus, in the present embodiment, at least one of the normal bus bar 421 and the relief terminal-provided bus bar 422 is selectively mounted to the first bolt (battery connection terminal) 412.

That is, the bus bar without the relief terminal 43 (normal bus bar 421) is mounted to the first bolt (battery connection terminal) 412 provided in the base unit 10, and thus the electrical connection structure 1 without the relief terminal 43 can be obtained. Accordingly, when it is not necessary to provide the relief terminal 43 in the electrical connection structure 1, it is possible to respond to the request that the electrical connection structure 1 without the relief terminal 43 be used.

In contrast, the bus bar having the relief terminal 43 (relief terminal-provided bus bar 422) is mounted to the first bolt (battery connection terminal) 412 provided in the base unit 10, and thus the electrical connection structure 1 provided with the relief terminal 43 can be obtained. This makes it possible to handle the case where the relief terminal 43 needs to be provided in the electrical connection structure 1.

Thus, in the electrical connection structure 1 described in the present embodiment, the base unit 10 is used as a common component. By selectively mounting the normal bus bar 421 and/or the relief terminal-provided bus bar 422 to the first bolt (battery connection terminal) 412 provided in the base unit 10, the presence or absence of the relief terminal 43 can be handled.

That is, by simply preparing a several types of bus bars that can be selectively mounted to the first bolt (battery connection terminal) 412 provided in the base unit 10, the electrical connection structure 1 capable of handling the presence or absence of the relief terminal 43 can be obtained.

For this reason, as compared with the case where a new case is separately prepared or the relief terminal 43 is provided in the power source distribution circuit component 30, the cost required for manufacturing the electrical connection structure 1 capable of handling the presence or absence of the relief terminal 43 can be reduced.

Thus, the configuration described in the present embodiment makes it possible to provide the electrical connection structure 1 which can be compatible with a variety of vehicle specifications at a lower cost.

Further, in the present embodiment, the base unit 10 includes the second bolt (load connection terminal) 413 which is electrically connected to the load 7, thereby constituting part of the battery circuit 4, and which is held in the case 2.

The normal bus bar 421 is a bus bar which is mounted to the first bolt (battery connection terminal) 412 and the second bolt (load connection terminal) 413, and is capable of electrically connecting the first bolt (battery connection terminal) 412 and the second bolt (load connection terminal) 413.

Specifically, the normal bus bar 421 has a first through hole 4211 into which the first bolt (battery connection terminal) 412 is inserted and a second through hole 4212 into which the second bolt (load connection terminal) 413 is inserted. When the normal bus bar 421 is mounted, the first bolt (battery connection terminal) 412 is inserted into the first through hole 4211 and the second bolt (load connection terminal) 413 is inserted into the second through hole 4212. Thus, the normal bus bar 421 is mounted to the first bolt (battery connection terminal) 412 and the second bolt (load connection terminal) 413 to electrically connect the first bolt (battery connection terminal) 412 and the second bolt (load connection terminal) 413. A frame-like locking piece 4213 is formed in the normal bus bar 421, and when the normal bus bar 421 is mounted to the base unit 10, the locking piece 4213 is locked to a locking projection 4113 formed on the base 411.

The relief terminal-provided bus bar 422 includes an approximately rectangular plate-like normal bus bar portion 4221, and a relief terminal portion 4222 which is connected continuously to the normal bus bar portion 4221 and serves as the relief terminal 43. Here, the normal bus bar portion 4221 is a portion that is mounted to the first bolt (battery connection terminal) 412 and the second bolt (load connection terminal) 413 and is capable of electrically connecting the first bolt (battery connection terminal) 412 and the second bolt (load connection terminal) 413. In the present embodiment, the normal bus bar portion 4221 has a first through hole 42211 into which the first bolt (battery connection terminal) 412 is inserted, and a second through hole 42212 into which the second bolt (load connection terminal) 413 is inserted. When the normal bus bar portion 4221 is mounted, the first bolt (battery connection terminal) 412 is inserted into the first through hole 42211, and the second bolt (load connection terminal) 413 is inserted into the second through hole 42212. Thus, the normal bus bar portion 4221 is mounted to the first bolt (battery connection terminal) 412 and the second bolt (load connection terminal) 413 to electrically connect the first bolt (battery connection terminal) 412 and the second bolt (load connection terminal) 413. A frame-like locking piece 42213 is also formed in the normal bus bar portion 4221, and when the normal bus bar portion 4221 is mounted to the base unit 10, the locking piece 42213 is locked to the locking projection 4113 formed on the base 411.

The relief terminal portion 4222 is formed so as to project upward from the normal bus bar portion 4221, and the battery 6 can be charged from another vehicle by connecting a clip portion of a booster cable to the relief terminal portion 4222 in a state in which a relief terminal cover 5 described later is open.

In addition, the normal bus bar 421 or the relief terminal-provided bus bar 422 is selectively mounted to the first bolt (battery connection terminal) 412 and the second bolt (load connection terminal) 413. That is, when any of the electrical connection structures 1 is used, only one of the normal bus bar 421 and the relief terminal-provided bus bar 422 is mounted to the base unit 10.

Thus, the electrical connection structure 1 provided with the relief terminal 43 can be obtained only by mounting only the relief terminal-provided bus bar 422 to the first bolt 412 and the second bolt 413 provided in the base unit 10.

That is, in order to provide the relief terminal 43 in the electrical connection structure 1, it is no longer necessary to mount both the normal bus bar 421 and the relief terminal-provided bus bar 422 to the first bolt (battery connection terminal) 412 and the second bolt (load connection terminal) 413.

This makes it possible to simplify the manufacturing process of the electrical connection structure 1 provided with the relief terminal 43, thereby obtaining the electrical connection structure 1 provided with the relief terminal 43 more easily.

In the present embodiment, in the state of the base unit 10, the first bolt (battery connection terminal) 412 and the second bolt (load connection terminal) 413 are electrically insulated from each other. Accordingly, in order to obtain the electrical connection structure 1 without the relief terminal 43, it is necessary to mount the normal bus bar 421 to the first bolt (battery connection terminal) 412 and the second bolt (load connection terminal) 413 provided in the base unit 10. In contrast, in order to obtain the electrical connection structure 1 provided with the relief terminal 43, it is necessary to mount the relief terminal-provided bus bar 422 to the first bolt (battery connection terminal) 412 and the second bolt (load connection terminal) 413 provided in the base unit 10.

Thus, in the present embodiment, either the normal bus bar 421 or the relief terminal-provided bus bar 422 is mounted to the first bolt (battery connection terminal) 412 and the second bolt (load connection terminal) 413, thereby handling the presence or absence of the relief terminal 43.

Accordingly, the configuration described in the present embodiment makes it possible to check not only the presence or absence of the relief terminal 43, but also the presence or absence of an electrical connection between the first bolt 412 and the second bolt 413, simply by checking a type of the battery circuit bus bar 42 that is mounted.

Further, in the present embodiment, when the relief terminal-provided bus bar 422 is mounted to the first bolt (battery connection terminal) 412, the electrical connection structure 1 is provided with the relief terminal cover 5 which is capable of covering the relief terminal 43 in an openable and closable manner.

This makes it possible to protect the relief terminal 43 that is not used by the relief terminal cover 5, and also possible to more reliably prevent fingers, tools, or the like from touching the relief terminal 43 when the relief terminal 43 is not used.

In the present embodiment, the relief terminal cover 5 is rotatably attached to the case 2. Specifically, the relief terminal cover 5 is provided with a lid body 51 for covering the relief terminal 43, a shaft 52 held by a bearing 215 and a shaft holding projection 216 formed in the case 2, and a shaft holding portion 53 for holding the shaft 52. The relief terminal cover 5 can be rotated between the closed state illustrated in FIG. 1 and the open state illustrated in FIG. 29.

Thus, the opening and closing operation of the relief terminal 43 performed by the relief terminal cover 5 can be performed more easily. In addition, by attaching the relief terminal cover 5 to the case 2, the loss of the relief terminal cover 5 when the relief terminal 43 is used can be suppressed more reliably.

Figure 27:
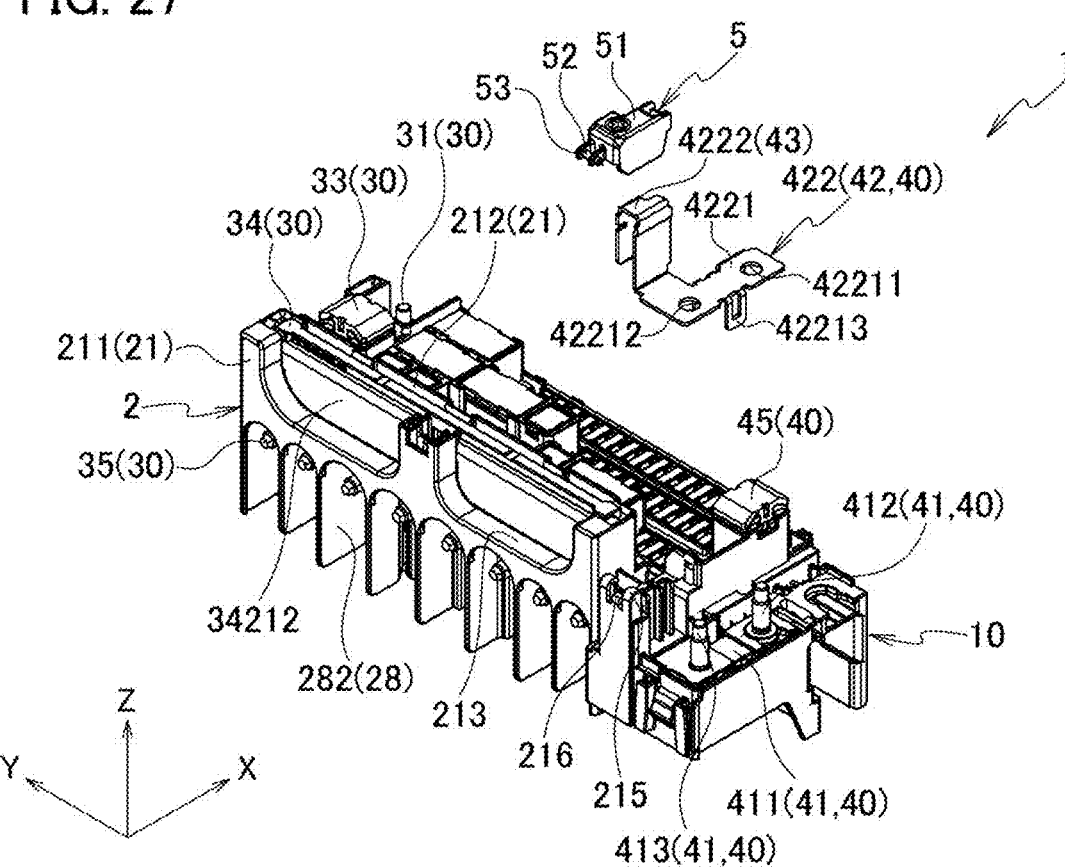
FIG. 27 is a diagram illustrating an example of an assembly method of the electrical connection structure provided with the relief terminal, and is a diagram illustrating a state before the bus bar with the relief terminal and a relief terminal cover are assembled to the base unit.
Figure 28:
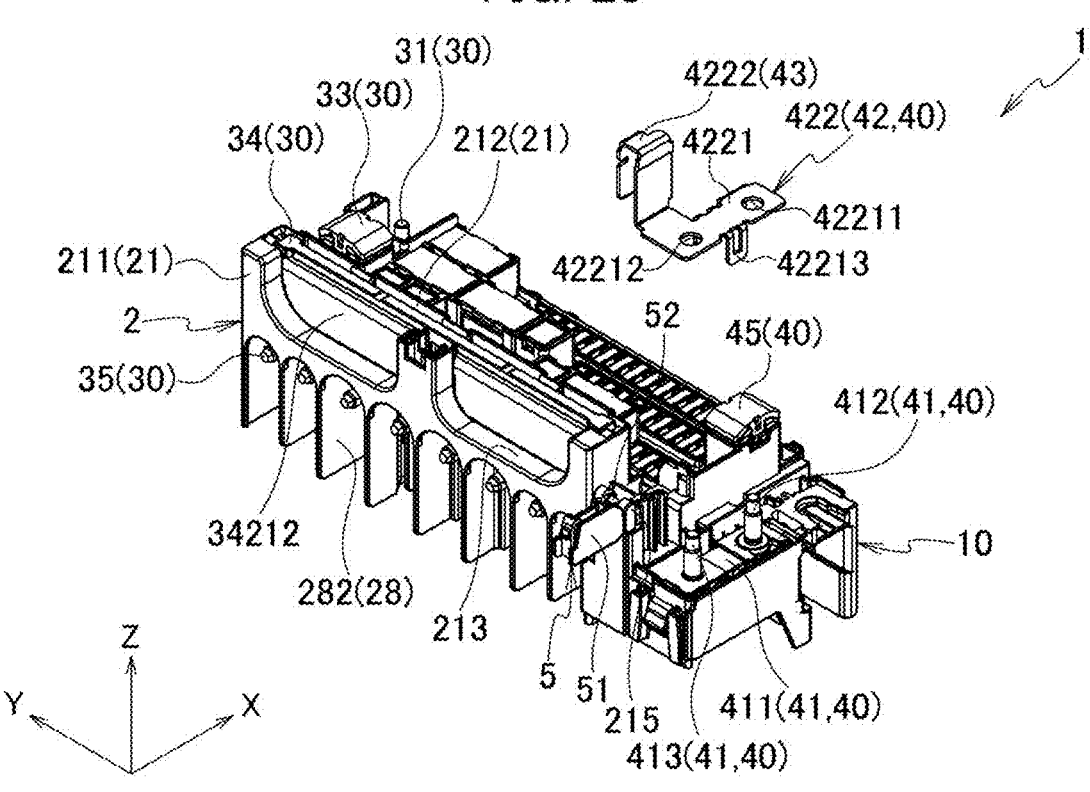
FIG. 28 is a diagram illustrating an example of an assembly method of the electrical connection structure provided with the relief terminal, and is a diagram illustrating a state in which the relief terminal cover is assembled to the base unit.
Figure 29:
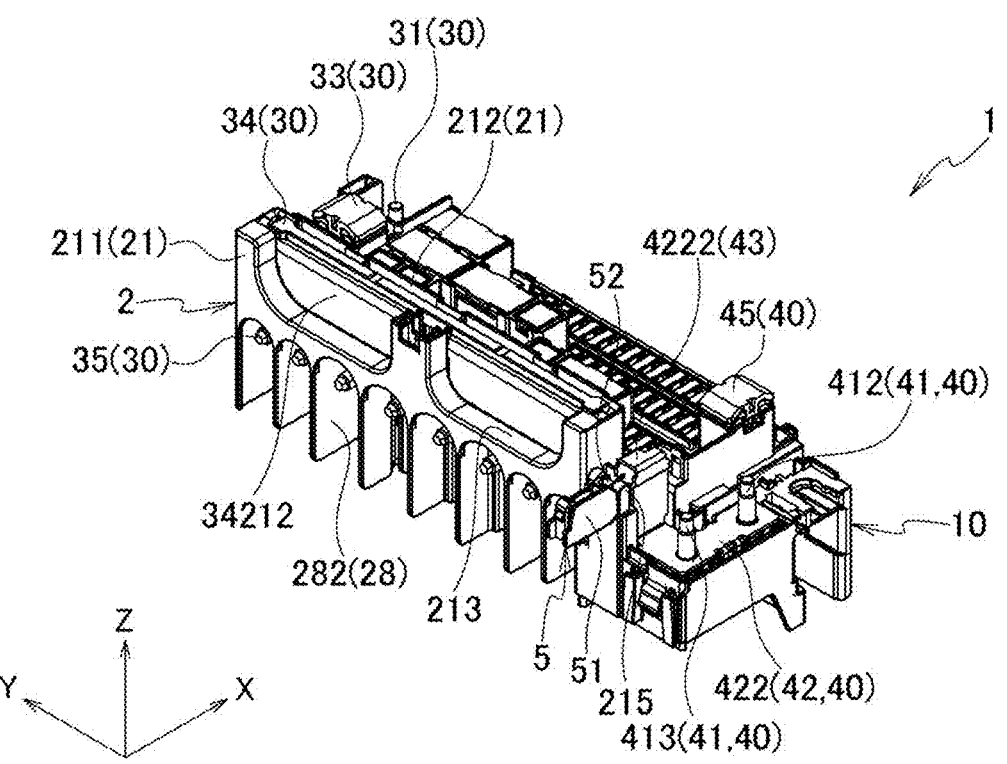
FIG. 29 is a diagram illustrating an example of an assembly method of the electrical connection structure provided with the relief terminal, and is a diagram illustrating a state in which the relief terminal cover is opened while the bus bar with the relief terminal and the relief terminal cover are assembled to the base unit.

FIGS. 27 to 29 illustrate a method of attaching the relief terminal cover 5 to the case 2 before mounting the relief terminal-provided bus bar 422 as an example; however, the present embodiment is not limited thereto. For example, the relief terminal cover 5 may be attached to the case 2, after the relief terminal-provided bus bar 422 is mounted, or at the same time as the relief terminal-provided bus bar 422 is mounted.

[Operation/Effect]

Hereinafter, the characteristic configuration of the electrical connection structure described in the above embodiment and the effects obtained therefrom will be described.

(1) The electrical connection structure 1 described in the above embodiment includes the case 2 having the power source distribution unit holding portion (holding portion) 27, and the power source distribution unit 34 which is inserted into and held in the power source distribution unit holding portion (holding portion) 27.

Further, the power source distribution unit holding portion (holding portion) 27 has the housing space 271 which opens in the upper side (one side) in the Z direction (up-down direction: first direction). The housing space 271 is a space in which the power source distribution unit 34 is housed by relatively moving the power source distribution unit 34 to the lower side (the other side) in the Z direction (up-down direction: first direction) with respect to the case 2. Further, the power source distribution unit holding portion (holding portion) 27 has the wall 21 defining the housing space 271.

The power source distribution unit 34 has the main body 340 formed so as to have an approximately twice-rotation symmetrical shape with respect to the imaginary line L1 extending in the Z direction (up-down direction: first direction). The main body 340 has the bus bar 341 having the power source connection portion 3411 and the plurality of load connection portions 3414, and capable of distributing power source. In addition, the main body 340 has the plurality of fuse portions 3413 interposed between the power source connection portion 3411 and the load connection portion 3414, and the cover 342 for holding the bus bar 341.

Further, the projection 3422 is formed at least on one of the main body 340 and the power source distribution unit holding portion (holding portion) 27.

Meanwhile, the groove 2712 into which the projection 3422 is inserted when the power source distribution unit 34 is inserted into the housing space 271 in a state of the normal position is formed at least on the other of the main body 340 and the power source distribution unit holding portion (holding portion) 27. Further, the restriction wall 214 which interferes with the projection 3422 when the power source distribution unit 34 is inserted into the housing space 271 in a state of the inverse position is formed at least on the other of the main body 340 and the power source distribution unit holding portion (holding portion) 27.

Further, the projection side inclined surface 34221 capable of guiding the projection 3422 into the groove 2712 by coming into contact with the restriction wall 214 when the power source distribution unit 34 is inserted into the housing space 271 in a state of the normal position is formed in the projection 3422.

As described above, in the electrical connection structure 1 described in the present embodiment, the power source distribution unit 34 has the main body 340 which is formed so as to have an approximately twice-rotation symmetrical shape with respect to the imaginary line L1 extending in the Z direction (up-down direction: first direction).

The projection 3422 is formed on the main body 340 and/or the holding portion 27. Further, the groove 2712 into which the projection 3422 is allowed to be inserted when the power source distribution unit 34 is normally inserted, and the restriction wall 214 which interferes with the projection 3422 when the power source distribution unit 34 is inversely inserted are formed on the holding portion 27 and/or the main body 340.

That is, the main body 340 has a shape that can be inversely inserted, and when the power source distribution unit 34 is inversely inserted, the projection 3422 interferes with the restriction wall 214 and thus the power source distribution unit 34 cannot be housed in the housing space 271. When the power source distribution unit 34 is normally inserted, the projection 3422 is inserted into the groove 2712 without interfering with the restriction wall 214, and thus the power source distribution unit 34 can be housed in the housing space 271. Here, "the power source distribution unit 34 is normally inserted" means that the power source distribution unit 34 is inserted into the housing space 271 in a normal state (a state of a normal position). In contrast, "the power source distribution unit 34 is inversely inserted" means that that the power source distribution unit 34 is inserted into the housing space 271 in a state (a state of an inverse position) in which the power source distribution unit 34 rotates 180 degrees about an axis in the Z direction (up-down direction: first direction) with respect to the normal position.

As described above, in the electrical connection structure 1 described in the present embodiment, the main body 340 has an approximately twice-rotation symmetrical shape with respect to the imaginary line L1 extending in the Z direction (up-down direction: first direction), thereby suppressing the shape of the main body 340 to be complicated. This makes it possible to manufacture the power source distribution unit 34 at a lower cost and more easily.

In addition, the main body 340 has a shape that can be inversely inserted, and the projection 3422, the restriction wall 214 and the groove 2712 restrict the power source distribution unit 34 to be inversely inserted. Thus, even in the case where the power source distribution unit 34 has a shape that can be inversely inserted, it is possible to suppress the power source distribution unit 34 to be inversely inserted more reliably.

The plurality of fusible link portions 3413 may have different allowable current values. In the case where the fusible link portions 3413 have different allowable current values, the arrangement order of allowable current values may be different between the state where the power source distribution unit 34 is in the normal position and the state where the power source distribution unit 34 is in the inverse position.

For this reason, in the case where the main body 340 has an approximately twice-rotation symmetrical shape in appearance and the arrangement relationship of the plurality of fuse portions 3413 is asymmetric, if the power source distribution unit 34 is made possible to be inversely inserted, an electric wire not corresponding to the fuse portion 3413 may be erroneously connected. For example, an electric wire having a low allowable current value may be erroneously connected to the fuse portion 3413 having a high allowable current value. Thus, if an electric wire having a low allowable current value is connected to the fuse portion 3413 having a high allowable current value, the fuse portion 3413 may not be melted even if an overcurrent is supplied to the electric wire, which may cause the overcurrent to be supplied to the electric wire continuously.

However, in the case where the electrical connection structure 1 described in the present embodiment is employed, even when the main body 340 has a shape that can be inversely inserted, it is possible to suppress the power source distribution unit 34 to be inversely inserted. This makes it possible to more reliably suppress an erroneous connection of the electric wire not corresponding to the fuse portion 3413.

Further, in the electrical connection structure 1 described in the present embodiment, the projection side inclined surface 34221 capable of guiding the projection 3422 into the groove 2712 by coming into contact with the restriction wall 214 when the power source distribution unit 34 is inserted into the housing space 271 in a state of the normal position is formed in the projection 3422. Thus, the power source distribution unit 34 can be housed in the housing space 271 more easily.

As described above, the electrical connection structure 1 described in the present embodiment makes it possible to manufacture the power source distribution unit 34 at a lower cost and more easily, and to suppress the power source distribution unit 34 to be erroneously inserted into the case 2, and to further improve the insertion work.

(2) Further, the restriction wall side inclined surface 2141 with which the projection side inclined surface 34221 comes into contact and which is capable of moving the projection 3422 in the direction away from the groove 2712 when the power source distribution unit 34 is inserted into the housing space 271 in a state of the inverse position may be formed on the restriction wall 214.

That is, the restriction wall side inclined surface 2141 is formed on the restriction wall 214, and when the power source distribution unit 34 is inversely inserted, the projection 3422 may move away from the groove 2712 by bringing the projection side inclined surface 34221 into contact with the restriction wall side inclined surface 2141.

Thus, when the projection 3422 interferes with the restriction wall 214 by inversely inserting the power source distribution unit 34, it is possible to move the projection 3422 away from the groove 2712 by moving the projection side inclined surface 34221 along the restriction wall side inclined surface 2141. By moving the projection 3422 away from the groove 2712, it is possible to more reliably suppress the projection 3422 to be erroneously inserted into the groove 2712 when the power source distribution unit 34 is inversely inserted. As a result, it is possible to prevent the power source distribution unit 34 from being forcibly pushed into the housing space 271 when the power source distribution unit 34 is inversely inserted, thereby making it possible to more reliably suppress the power source distribution unit 34 to be erroneously inserted into the case 2.

(3) Further, when the power source distribution unit 34 is inserted into the housing space 271 in a state of the inverse position, the projection side inclined surface 34221 and the restriction wall side inclined surface 2141 may have surface contact with each other.

This makes it possible to disperse the stress generated when the projection 3422 interferes with the restriction wall 214 caused by inversely inserting the power source distribution unit 34. That is, this makes it possible to suppress a partial concentration of the stress generated when the projection 3422 interferes with the restriction wall 214 caused by inversely inserting the power source distribution unit 34. Accordingly, it is possible to more reliably suppress the projection 3422 and the restriction wall 214 to be broken when the power source distribution unit 34 is inversely inserted.

(4) Further, the power source distribution unit may be a multi-fusible link unit 34 having a plurality of fusible link portions 3413 serving as the fuse portions.

Thus, in the case of having a plurality of fusible links (fusible link portions 3413) having a greater allowable current value than the fuse 332, the plurality of fusible links (fusible link portions 3413) can be collectively inserted and held in the case 2.

(5) Further, the plurality of fusible link portions 3413 may be formed in the bus bar 341.

Thus, it is not necessary to attach the respective fusible links to the bus bar, thereby reducing the number of components and enabling cost reduction. Further, by forming a plurality of fusible link portions 3413 in the bus bar 341, the multi-fusible link unit 34 can be reduced in thickness.

[Others]

Although the present embodiment has been described above, the present embodiment is not limited to the above description, and various modifications can be made within a scope of the gist of the present embodiment.

For example, in the above embodiment, the normal bus bar 421 or the relief terminal-provided bus bar 422 is selectively mounted; however, the present disclosure is not limited to such a configuration, and various configurations are possible. For example, the present disclosure may have a configuration in which the base unit 10 includes the normal bus bar 421, and with which it is possible to handle the presence or absence of a relief terminal based on whether or not the relief terminal-provided bus bar 422 is mounted to the first bolt (battery connection terminal) 412. In this case, the normal bus bar 421 and the relief terminal-provided bus bar 422 are mounted, thereby making it possible to obtain the electrical connection structure provided with the relief terminal. The base unit 10 in a state where the relief terminal-provided bus bar 422 is not mounted serves as the electrical connection structure without the relief terminal.

Further, it is possible to attach the relief terminal cover 5 directly to the relief terminal 43 instead of attaching the relief terminal cover 5 to the case 2.

Although the multi-fusible link unit 34 is exemplified as a power source distribution unit in the above embodiment, it is also possible to apply the present disclosure to a configuration in which a power integration as a power source distribution unit is housed in a case.

Further, it is possible to provide a projection on the holding portion 27, and the main body 340 can be provided with a groove into which the projection is inserted, and a restriction wall that interferes with the projection when the power source distribution unit 34 is inserted into the housing space 271 in a state of the inverse position. In addition, the main body 340 can be provided with the projection, the groove, and the restriction wall, and the groove, the restriction wall, and the projection can be provided in the corresponding portions of the holding portion. That is, a set of the projection, the groove, and the restriction wall can be formed in any number at any place of the main body 340 and the holding portion 27.

Further, it is possible to adopt a configuration in which the restriction wall side inclined surface 2141 is not formed on the restriction wall 214.

Further, it is possible to prevent the projection side inclined surface 34221 and the restriction wall side inclined surface 2141 from having surface contact with each other when the power source distribution unit 34 is inserted into the housing space 271 in a state of the inverse position.

Further, the case 2 can be configured to hold spare components and tools.

Further, it is possible to apply the present disclosure to an electrical connection structure that is not intended to be compatible with a variety of vehicle specifications.

Further, the specifications (shape, size, layout, etc.) of the case, power source distribution circuit, and other particulars may be changed as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electrical connection structure comprising:
a case having a holding portion; and
a power source distribution unit which is inserted into and held in the holding portion, wherein
the holding portion includes:
a housing space which opens in one side in a first direction and in which the power source distribution unit is housed by relatively moving the power source distribution unit to the other side in the first direction with respect to the case; and
a wall defining the housing space, and
the power source distribution unit is provided with a main body including: a bus bar having a power source connection portion and a plurality of load connection portions, and capable of distributing power source; a plurality of fuse portions interposed between the power source connection portion and the load connection portion; and a cover for holding the bus bar,
the main body is formed so as to have an approximately twice-rotation symmetrical shape with respect to an imaginary line extending in the first direction,
a projection is formed at least on one of the main body and the holding portion,
a groove into which the projection is inserted when the power source distribution unit is inserted into the housing space in a state of a normal position, and a restriction wall which interferes with the projection when the power source distribution unit is inserted into the housing space in a state of an inverse position are formed at least on the other of the main body and the holding portion, and
a projection side inclined surface capable of guiding the projection into the groove by coming into contact with the restriction wall when the power source distribution unit is inserted into the housing space in a state of the normal position is formed in the projection.

2. The electrical connection structure according to claim 1, wherein
a restriction wall side inclined surface with which the projection side inclined surface comes into contact and which is capable of moving the projection in a direction away from the groove when the power source distribution unit is inserted into the housing space in a state of the inverse position is formed on the restriction wall.

3. The electrical connection structure according to claim 2, wherein
when the power source distribution unit is inserted into the housing space in a state of the inverse position, the projection side inclined surface and the restriction wall side inclined surface have surface contact with each other.

4. The electrical connection structure according to claim 1, wherein
the power source distribution unit is a multi-fusible link unit having a plurality of fusible link portions serving as the fuse portions.

5. The electrical connection structure according to claim 4, wherein
the plurality of fusible link portions are formed in the bus bar.

* * * * *